US012766832B2

(12) United States Patent
Takino

(10) Patent No.: US 12,766,832 B2
(45) Date of Patent: Oct. 20, 2026

(54) LIQUID EJECTION HEAD AND LIQUID EJECTION APPARATUS HAVING OVERLAPPING REGIONS

(71) Applicant: SEIKO EPSON CORPORATION, Tokyo (JP)

(72) Inventor: Fumiya Takino, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

(21) Appl. No.: 18/898,102

(22) Filed: Sep. 26, 2024

(65) Prior Publication Data

US 2025/0108616 A1 Apr. 3, 2025

(30) Foreign Application Priority Data

Sep. 29, 2023 (JP) ................................ 2023-169926

(51) Int. Cl.
*B41J 2/14* (2006.01)
*B41J 2/155* (2006.01)
*B41J 11/00* (2006.01)

(52) U.S. Cl.
CPC ....... *B41J 2/14072* (2013.01); *B41J 2/14233* (2013.01); *B41J 2/155* (2013.01); *B41J 11/005* (2013.01); *B41J 11/007* (2013.01); *B41J 2002/14241* (2013.01); *B41J 2002/14362* (2013.01); *B41J 2002/14419* (2013.01); *B41J 2202/11* (2013.01); *B41J 2202/20* (2013.01)

(58) Field of Classification Search
CPC .... B41J 2/14072; B41J 2/14233; B41J 2/155; B41J 11/005; B41J 11/007; B41J 2002/14241; B41J 2002/14362; B41J 2002/14419; B41J 2202/11; B41J 2202/20
See application file for complete search history.

(56) References Cited

U.S. PATENT DOCUMENTS 9,522,526 B1 * 12/2016 Aiba .................... B41J 2/14233

FOREIGN PATENT DOCUMENTS

JP 2016-000489 A 1/2016

* cited by examiner

*Primary Examiner* — Henok D Legesse
(74) *Attorney, Agent, or Firm* — WORKMAN NYDEGGER

(57) ABSTRACT

A liquid ejection head includes four or more head chips disposed along a first-direction in a staggered manner, and a support member supporting the head chips, wherein the head chips are disposed to have overlapping regions where a part of a nozzle forming region of one head chip of adjacent head chips and a part of a nozzle forming region of other head chip overlap when viewed in a second direction that is perpendicular to the first-direction, the overlapping regions include a first-overlapping region, and a second-overlapping region that is farther away from a center position of a total nozzle forming region with respect to the first-direction than the first-overlapping region, the total nozzle forming region including all the nozzle forming regions of the head chips, and the first-overlapping region is larger than the second-overlapping region with respect to the first-direction.

15 Claims, 21 Drawing Sheets

LIQUID EJECTION HEAD AND LIQUID EJECTION APPARATUS HAVING OVERLAPPING REGIONS

The present application is based on, and claims priority from JP Application Serial Number 2023-169926, filed Sep. 29, 2023, the disclosure of which is hereby incorporated by reference herein in its entirety.

BACKGROUND

1. Technical Field

The present disclosure relates to a liquid ejection head and a liquid ejection apparatus.

2. Related Art

There has been proposed a liquid ejection apparatus including a liquid ejection head that ejects liquid such as ink, or the like, to a medium such as a print sheet.

A liquid ejection head described in JP-A-2016-489 includes a plurality of head chips disposed in a staggered manner, a fixing plate, and a case member. The plurality of head chips is housed and supported in a space formed by the fixing plate and the case member.

In a liquid ejection head described in JP-A-2016-489, adjacent head chips of a plurality of head chips have overlapping regions where the adjacent head chips overlap with each other. In JP-A-2016-489, the plurality of head chips is disposed in a staggered manner, and there is a plurality of overlapping regions. In such liquid ejection heads with the plurality of overlapping regions, no adequate consideration has been given to a size of each of the overlapping regions.

SUMMARY

A liquid ejection head according to one aspect of the present disclosure includes a plurality of, four or more, head chips disposed along a first direction in a staggered manner, and a support member supporting the plurality of head chips, the plurality of head chips is disposed to have overlapping regions where a part of a nozzle forming region of one head chip of adjacent head chips and a part of a nozzle forming region of other head chip overlap when viewed in a second direction that is perpendicular to the first direction, the plurality of overlapping regions includes a first overlapping region, and a second overlapping region that is farther away from a center position of a total nozzle forming region with respect to the first direction than the first overlapping region, the total nozzle forming region including all the nozzle forming regions of the plurality of head chips, and the first overlapping region is larger than the second overlapping region with respect to the first direction.

A liquid ejection apparatus according to another aspect of the present disclosure includes a liquid ejection head that ejects liquid to a medium, and a transport unit that transports the medium.

In the liquid ejection apparatus according to the one aspect of the present disclosure, the plurality of overlapping regions includes a third overlapping region having a size smaller than the size of the first overlapping region with respect to the first direction, and the second overlapping region is disposed between the first overlapping region and the third overlapping region with respect to the first direction, and the support member has a notch between the second overlapping region and the third overlapping region. The liquid ejection apparatus includes a liquid ejection head that ejects liquid to a medium and a suppressing unit that suppresses floating of the medium, the suppressing unit being disposed in the notch.

DESCRIPTION OF EMBODIMENTS

Figure 1:
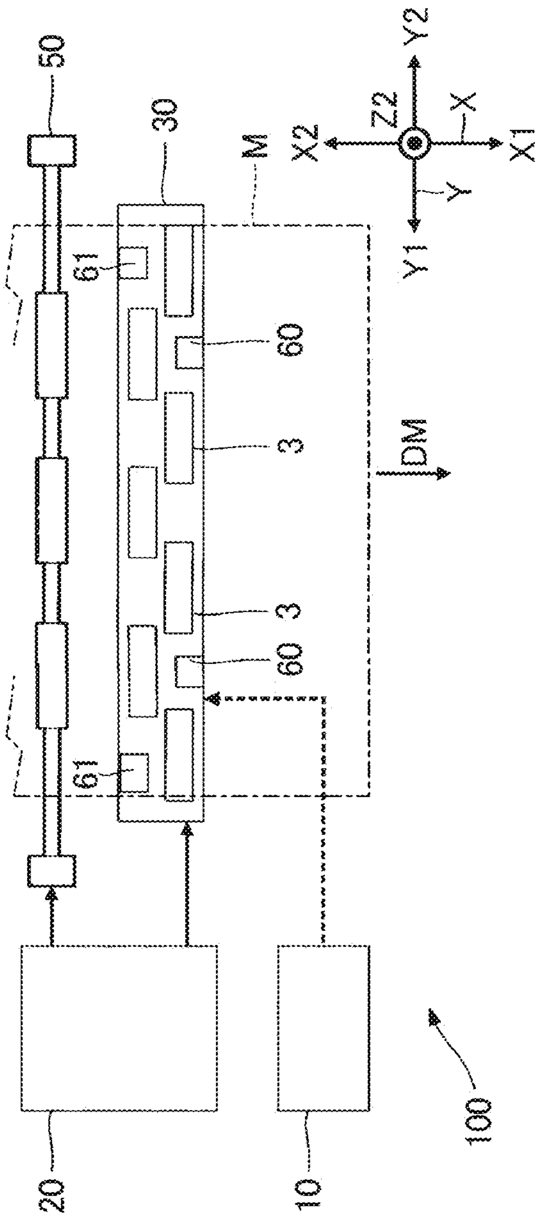
FIG. 1 is a schematic diagram illustrating a configuration example of a liquid ejection apparatus according to a first embodiment.

Hereinafter, a description will be given of preferable embodiments according to the present disclosure, with respect to the accompanying drawings. Note that the dimensions and scale of each part in the drawings may differ from the actual dimensions, and some parts are schematically illustrated to facilitate understanding. In addition, the scope of the present disclosure is not limited to these forms unless otherwise specified in the following description to the effect that the present disclosure is limited.

In addition, the following description will be given appropriately using an X-axis, a Y-axis, and a Z-axis that are mutually intersecting. In addition, a direction along the X-axis is referred to as an X1 direction, and a direction opposite to the X1 direction is referred to as an X2 direction. Similarly, directions that are opposite to each other along the Y-axis are referred to as a Y1 direction and a Y2 direction. Similarly, directions that are opposite to each other along the Z-axis are referred to as a Z1 direction and a Z2 direction. The Y1 direction and the Y2 direction are examples of the "first direction". The X1 direction and the X2 direction are examples of the "second direction". In the following, viewing in the Z1 direction and the Z2 direction is referred to as a "planar view".

Typically, the Z-axis is a perpendicular axis, and the Z1 direction corresponds to a downward direction in the perpendicular direction. However, the Z-axis does not have to be a perpendicular axis. In addition, the X-axis, the Y-axis, and the Z-axis are typically perpendicular to each other, but are not limited to this, and may intersect at an angle ranging from 80° to 100°, for example.

1. First Embodiment

1-1. Schematic Configuration of the Liquid Ejection Apparatus 100

FIG. 1 is a schematic diagram illustrating a configuration example of a liquid ejection apparatus 100 according to a first embodiment. The liquid ejection apparatus 100 is an ink jet type printer that ejects ink, which is an example of liquid, as droplets onto a medium M. The medium M is typically a print sheet. Note that the medium M is not limited to a print sheet, and may be a print target of any material, such as a resin film or a cloth.

As illustrated in FIG. 1, the liquid ejection apparatus 100 includes a liquid container 10, a control unit 20, a transport unit 50, a liquid ejection head 30, a plurality of suppressing units 60, and a plurality of suppressing units 61.

The liquid container 10 is a container for storing ink. Examples of specific aspects of the liquid container 10 include a cartridge that can be attached to or detached from the liquid ejection apparatus 100, a bag-shaped ink pack formed of a flexible film, and an ink tank that can be refilled with ink, or the like. Note that types of ink to be stored in the liquid container 10 are not specifically limited and optional.

The control unit 20 controls operations of each element of the liquid ejection apparatus 100. The control unit 20 includes, for example, a processing circuit such as a CPU (Central Processing Unit) or an FPGA (Field Programmable Gate Array), and a memory circuit such as a semiconductor memory, and controls operations of each element of the liquid ejection apparatus 100.

The transport unit 50 transports the medium M in a DM direction under the control of the control unit 20. The DM direction in the present embodiment is the X1 direction. In an example illustrated in FIG. 1, the transport unit 50 includes a transport roller that is elongated along the Y-axis and a motor that rotates the transport roller. Note that the transport unit 50 is not limited to a configuration that uses a transport roller, and may be configured to use a drum or an endless belt that transports the medium M adsorbed on an outer peripheral surface by electrostatic force, or the like.

The suppressing units 60 and 61 are provided on an unillustrated head support unit that supports the liquid ejection head 30. The suppressing units 60 and 61 suppress floating of the medium M relative to the liquid ejection head 30. The suppressing units 60 and 61 include, for example, a knurled roller that drivenly rotates while in contact with the medium M being transported. The knurled roller is rotatable around a rotating shaft along the Y-axis, and a plurality of protrusions is provided on an outer peripheral part of the rotating shaft.

Under the control of the control unit 20, the liquid ejection head 30 ejects ink supplied from the liquid container 10 from each of a plurality of nozzles N onto the medium M in the Z2 direction. The liquid ejection head 30 is a line head that is elongated in a direction in which the Y-axis extends. The liquid ejection head 30 includes a plurality of head chips 3 disposed such that the plurality of nozzles N is distributed over an entire range of the medium M in a direction along the Y-axis.

Ink being ejected from the liquid ejection head 30 concurrently with transport of the medium M by the transport unit 50, an image is formed by ink on a surface of the medium M.

Note that the number and arrangement of the head chips 3 of the liquid ejection head 30 is not limited to the example illustrated in FIG. 1, and are optional. In addition, if the liquid ejection head 30 is configured to be capable of circulating ink, the liquid ejection head 30 may be connected to the liquid container 10 via a circulating mechanism for circulating ink in the liquid ejection head 30.

The above-described liquid ejection apparatus 100 includes the liquid ejection head 30 that ejects ink to the medium M and the transport unit 50 that transports the medium M, as described above. As will be described below, in the liquid ejection head 30, a difference in landing deviations is reduced among the plurality of head chips 3.

Therefore, according to the liquid ejection apparatus 100 including such a liquid ejection head 30, it is possible to suppress deterioration in print quality.

In addition, the liquid ejection apparatus 100 includes the liquid ejection head 30 and the suppressing units 60 that suppresses the floating of the medium M. A detailed description will be given below. However, it is possible to effectively suppress the floating of the medium M by the suppressing unit 60, while reducing a size of the liquid ejection head 30 in a direction along the Y-axis. Therefore, according to the liquid ejection apparatus 100 including such a liquid ejection head 30, it is possible to suppress the deterioration in the print quality, while reducing the size.

1-2. Overall Configuration of Head Chip 3

Figure 2:
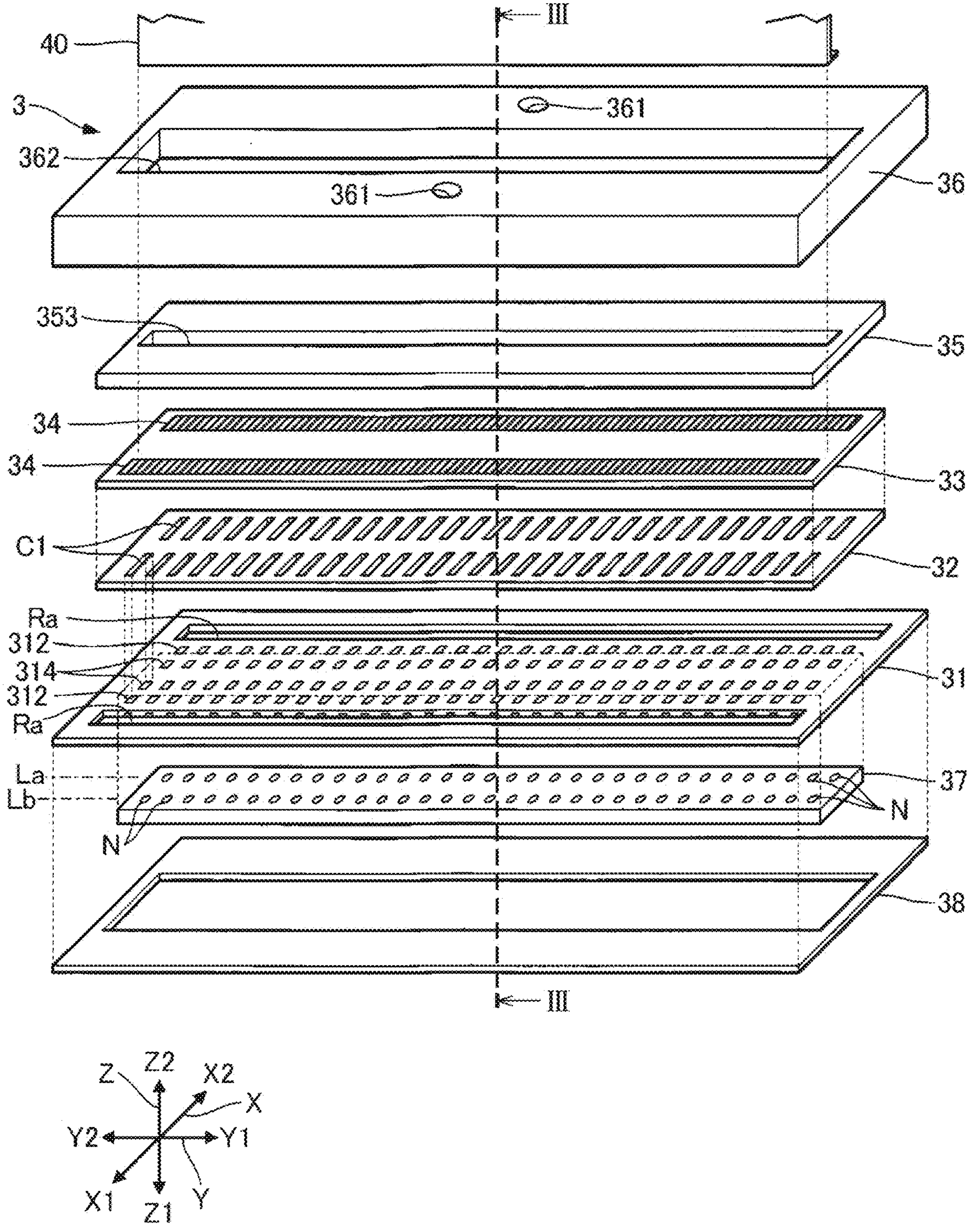
FIG. 2 is an exploded perspective view of the liquid ejection head illustrated in FIG. 1.
Figure 3:
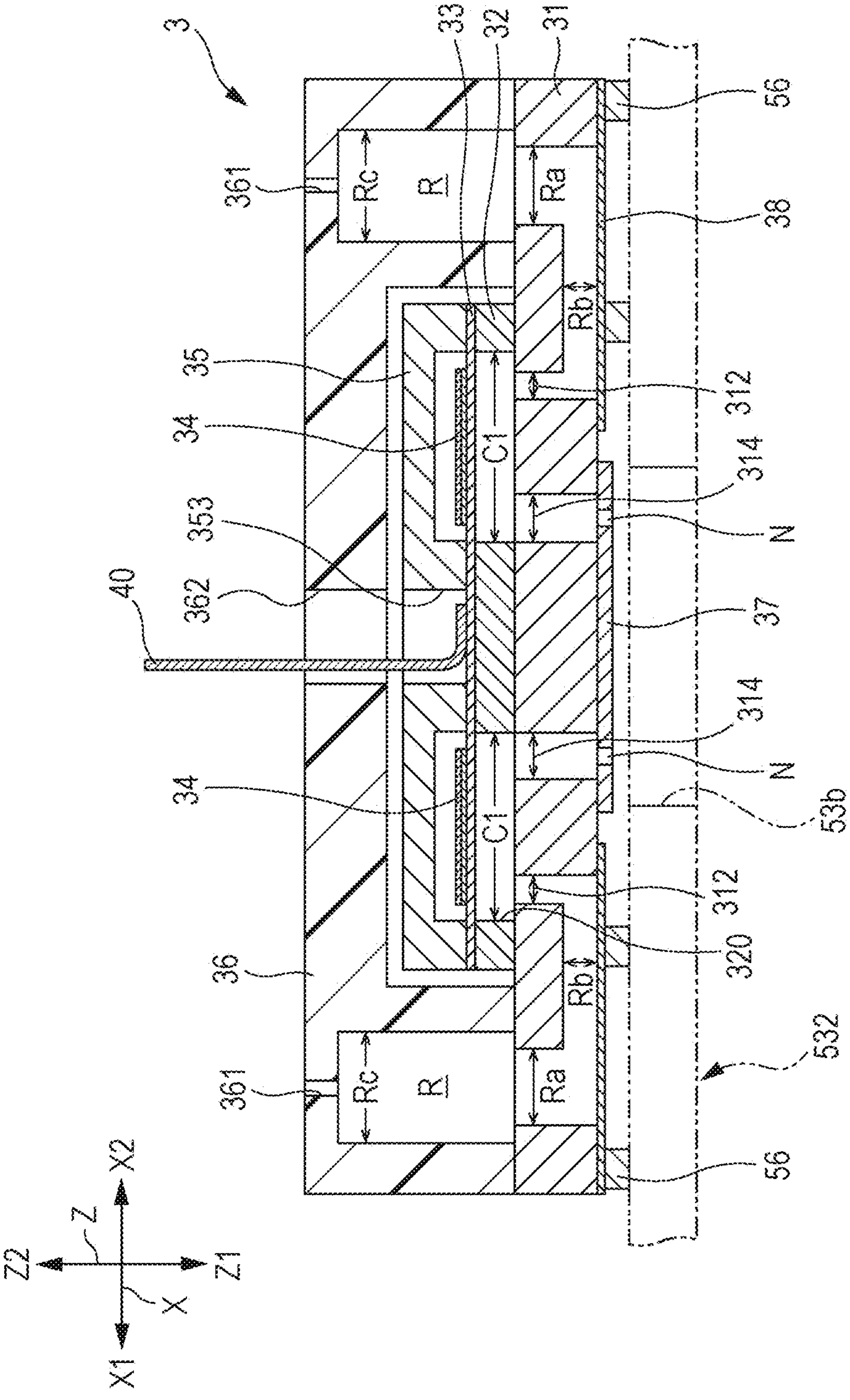
FIG. 3 is a cross-sectional view taken along a line III-III in FIG. 2.

FIG. 2 is an exploded perspective view of the head chip 3 illustrated in FIG. 1. FIG. 3 is a cross-sectional view of a line III-III in FIG. 2. A cross section illustrated in FIG. 3 is a cross section parallel to an X-Z plane. The Z-axis is an axial line along an ink ejection direction by the liquid ejection head 30.

As illustrated in FIG. 2, the head chip 3 includes the plurality of nozzles N arranged along the Y-axis. The plurality of nozzles N is divided into a nozzle row La and a nozzle row Lb that are placed side by side with a space therebetween along the X-axis. Each of the nozzle row La and the nozzle row Lb is a collection of the plurality of nozzles N arranged linearly along the Y-axis. The liquid ejection head 30 is such configured that elements related to respective nozzles N of the nozzle row La and elements related to respective nozzles N of the nozzle row Lb are approximately plane-symmetrically disposed. In the following description, the elements corresponding to the nozzle row La will be mainly described, and a description of the elements corresponding to the nozzle row Lb will be omitted as appropriate. In addition, in the following, when a distinction is not made between the nozzle row La and the nozzle row Lb, they will be referred as the nozzle row L.

As illustrated in FIG. 2 and FIG. 3, the head chip 3 includes a communicating plate 31, a pressure chamber substrate 32, a vibration plate 33, a nozzle plate 37, a vibration absorber 38, a plurality of driving elements 34, a sealing substrate 35, a housing portion 36, and a wiring substrate 40.

Each of the communicating plate 31, the pressure chamber substrate 32, the vibration plate 33, the nozzle plate 37, and the vibration absorber 38 is an elongated plate-like member along the Y-axis. The pressure chamber substrate 32 and the housing portion 36 are installed on a surface of the communicating plate 31 in the Z2 direction. The nozzle plate 37 and the vibration absorber 38 are installed on a surface of the communicating plate 31 in the Z1 direction. For example, the respective members are fixed together by an adhesive, for example.

The nozzle plate 37 is a plate-like member on which the plurality of nozzles N is formed. Each of the plurality of nozzles N is a circular through-hole for ejecting ink. For example, the nozzle plate 37 is manufactured by processing a monocrystalline substrate of silicon (Si) utilizing semiconductor manufacturing techniques such as photolithography and etching, or the like.

A plurality of narrowing portions 312, a plurality of communicating flow channels 314, a communicating space Ra, and a common flow channel Rb are formed on the communicating plate 31. The narrowing portions 312 and the communicating flow channel 314 are each a through-hole extending in the Z1 direction and formed for each of the nozzles N. The communicating flow channel 314 overlaps with the nozzles N in a planar view. The communicating space Ra is an opening formed in an elongated shape along the Y-axis. The communicating space Ra extends along the Y-axis. The common flow channel Rb communicates to the communicating space Ra and overlaps with the communication space Ra in a planar view. The common flow channel Rb extends along the Y-axis. The common flow channel Rb communicates to the plurality of narrowing portions 312. In addition, the communicating space Ra causes the common flow channel Rb and an external flow channel of the head chip 3 to communicate with each other via a space Rc and a supply port 361 which are described below.

A plurality of pressure chambers C1 is formed in the pressure chamber substrate 32. The pressure chamber C1 is a space located between the communicating plate 31 and the vibration plate 33, and formed by a wall surface 320 of the pressure chamber substrate 32. The pressure chamber C1 is formed for each of the nozzles N. The pressure chamber C1 is an elongated space extending in the X1 direction. The plurality of the pressure chambers C1 is arranged along the Y-axis. The nozzle N communicates to one end of the pressure chamber C1 in the X1 direction, via the communicating flow channel 314. The narrowing portion 312 communicates to the other end of the pressure chamber C1 in the X1 direction. The narrowing portion 312 has a smaller cross-sectional area than the pressure chamber C1. In addition, the pressure chamber C1, the nozzle N, the communicating flow channel 314, and the narrowing portion 312 constitute an individual flow channel for each of the nozzles N.

The communicating plate 31 and the pressure chamber substrate 32 are manufactured by processing a semiconductor substrate such as a silicon monocrystalline substrate, for example.

The vibration plate 33 which is elastically deformable is disposed in the upper part of the pressure chamber C1. The vibration plate 33 is laminated on the pressure chamber substrate 32, and contacts a surface of the pressure chamber substrate 32 opposite to the communicating plate 31. The vibration plate 33 is a plate-like member formed in an elongated rectangular shape along the Y-axis in a planar view. A thickness direction of the vibration plate 33 is parallel to the Z1 direction. The pressure communicating chamber C1 communicates to the communicating flow channel 314 and the narrowing portion 312. Therefore, the pressure chamber C1 communicates to the nozzles N via the communicating flow channel 314, and communicates to the communicating space Ra via the narrowing portion 312. Note that, for ease of explanation, the pressure chamber substrate 32 and the vibration plate 33 are illustrated as separate substrates in FIG. 2, but in reality, they are laminated on a single silicon substrate.

A driving element 34 is formed for each pressure chamber C1 on a surface of the vibration plate 33 opposite to the pressure chamber C1. The driving element 34 is an elongated piezoelectric element along the X-axis in a planar view. The driving element 34 includes, for example, a pair of electrodes and a piezoelectric body sandwiched between the pair of electrodes. Note that the driving element 34 may be an electrothermal conversion element that generates thermal energy.

The housing portion 36 is a case for storing ink supplied to the plurality of pressure chambers C1, and is formed by, for example, injection molding of a resin material. The space Rc and the supply port 361 are formed in the housing portion 36. The supply port 361 is a conduit through which ink is supplied from the liquid container 10 and communicates to the space Rc. The space Rc in the housing portion 36 and the communicating space Ra of the communicating plate 31 communicate with each other. The communicating space Ra, the common flow channel Rb, and the space Rc described above constitute a common R common to the plurality of nozzles N. The common space R functions as a liquid storage chamber that stores ink to be supplied to the plurality of pressure chambers C1. The ink stored in the common space R branches off to each of the narrowing portions 312, and is supplied to and filled in parallel with the plurality of pressure chambers C1.

The vibration absorber 38 is a flexible film that constitutes the wall surface of the communicating space Ra, and absorbs pressure fluctuations of ink in the common space R. The vibration absorber 38 is, for example, a laminated body of an ink-resistant resin film, a SUS (stainless steel) member that holds the resin film and has spring properties, and a fixing plate that protects the resin film and the SUS member. Provision of the vibration absorber 38 stabilizes natural vibration frequency of the flow channel from the nozzles N through the pressure chambers C1 to the narrowing portion 312, irrespective of the nozzles N that are driven.

A frame body 56 is bonded to a surface facing the Z1 direction of the vibration absorber 38 with an adhesive, or the like. The frame body 56 is a frame-shaped member along an outer periphery of the vibration absorber 38. The frame body 56 includes, for example, a metal material. A fixing plate 532, to be described below, is bonded to the surface facing the Z1 direction of the frame body 56 with an adhesive, or the like, as depicted by a two-dot chain line in the figure.

The sealing substrate 35 is a structure body that protects a plurality of the driving elements 34 and reinforces mechanical strength of the pressure chamber substrate 32 and the vibration plate 33. The sealing substrate 35 is fixed to a surface of the vibration plate 33 with, for example, an adhesive, or the like. The plurality of driving elements 34 is housed inside a concave portion formed on a surface of the sealing substrate 35 opposed to the vibration plate 33. In addition, the wiring substrate 40 is inserted through a through-hole 362 of the housing portion 36 and the through-hole 353 of the sealing substrate 35. The wiring substrate 40 is bonded to the surface of the vibration plate 33. The wiring substrate 40 is a mounted component on which a plurality of wire lines for electrically connecting the control unit 20 with the head chip 3 is formed. The wiring substrate 40 includes a driving IC. The driving IC is a circuit including a switching element that selects whether or not to supply a drive signal Com to the driving elements 34. For example, a TCP (Tape Carrier Package) or an FPC (flexible Printed Circuit), or the like is used, as the wiring substrate 40. A driving signal for driving the driving elements 34 and a reference voltage are supplied to the each of driving elements 34 from the wiring substrate 40.

In such a head chip 3, when the driving elements 34 shrink due to current being carried, the vibration plate 33 is bent and deflected in a direction in which a volume of the pressure chamber C1 is reduced. Then, a pressure in the pressure chambers C1 increases, causing ink droplets to be ejected from the nozzles N. At this time, the pressure also propagates from the pressure chambers C1 toward the narrowing portion 312, and ink also flows into the common flow channel Rb through the narrowing portion 312. After the ink is ejected, the driving element 34 returns to its original position. At this time, the ink in the common flow channel Rb from the nozzle N also vibrates. Then, at the same time that the meniscus of the nozzle N returns to its original state, ink is supplied from the narrowing portion 312. With a series of the operations described above, ink is ejected from the nozzles N.

1-3. Liquid Ejection Head 30

Figure 4:
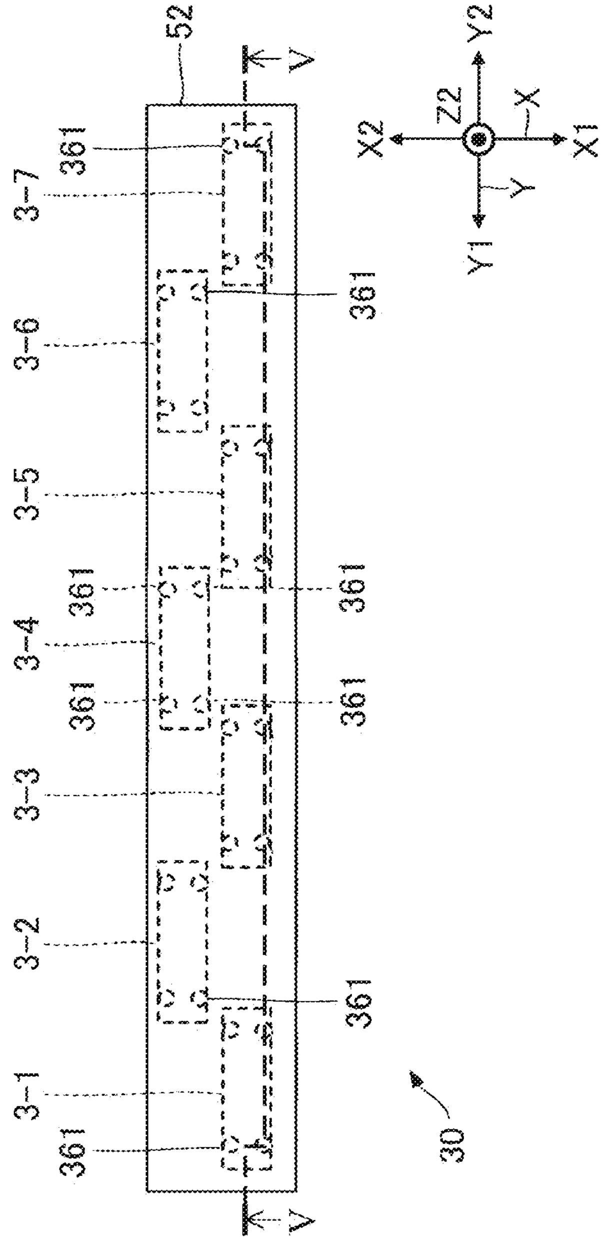
FIG. 4 is a top view of a liquid ejection head of the first embodiment.
Figure 5:
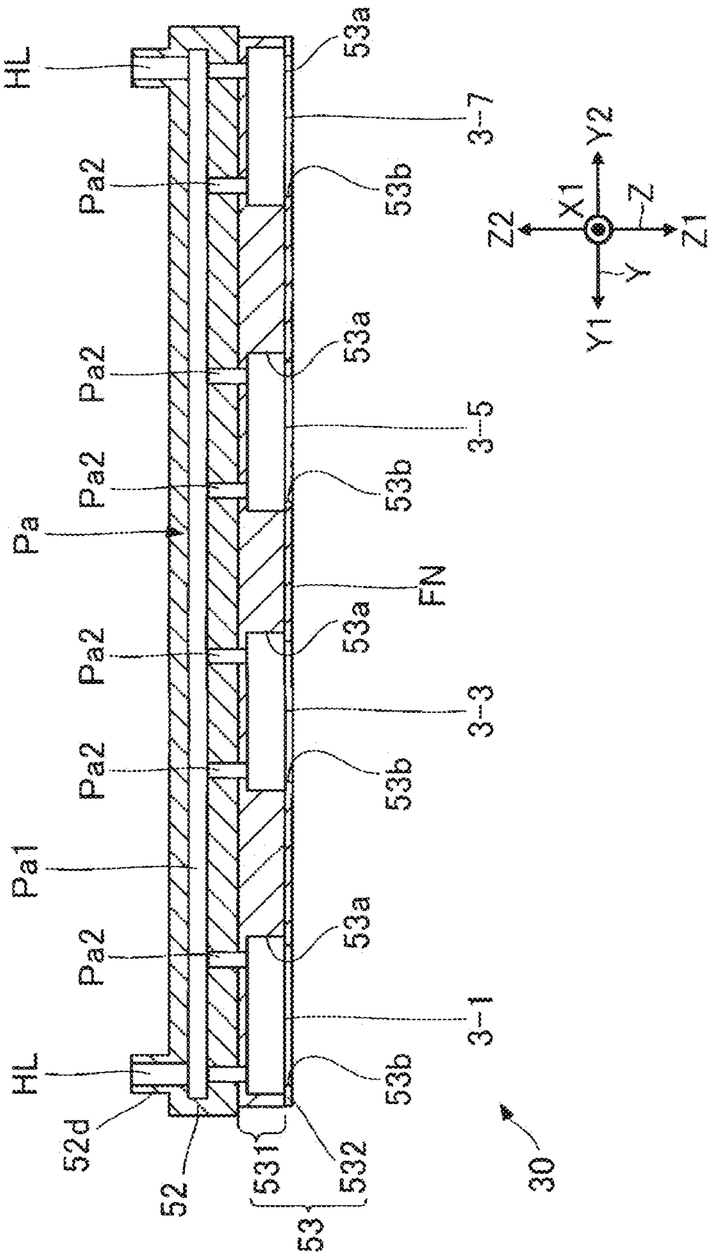
FIG. 5 is a cross-sectional view taken along a line V-V in FIG. 4.
Figure 6:
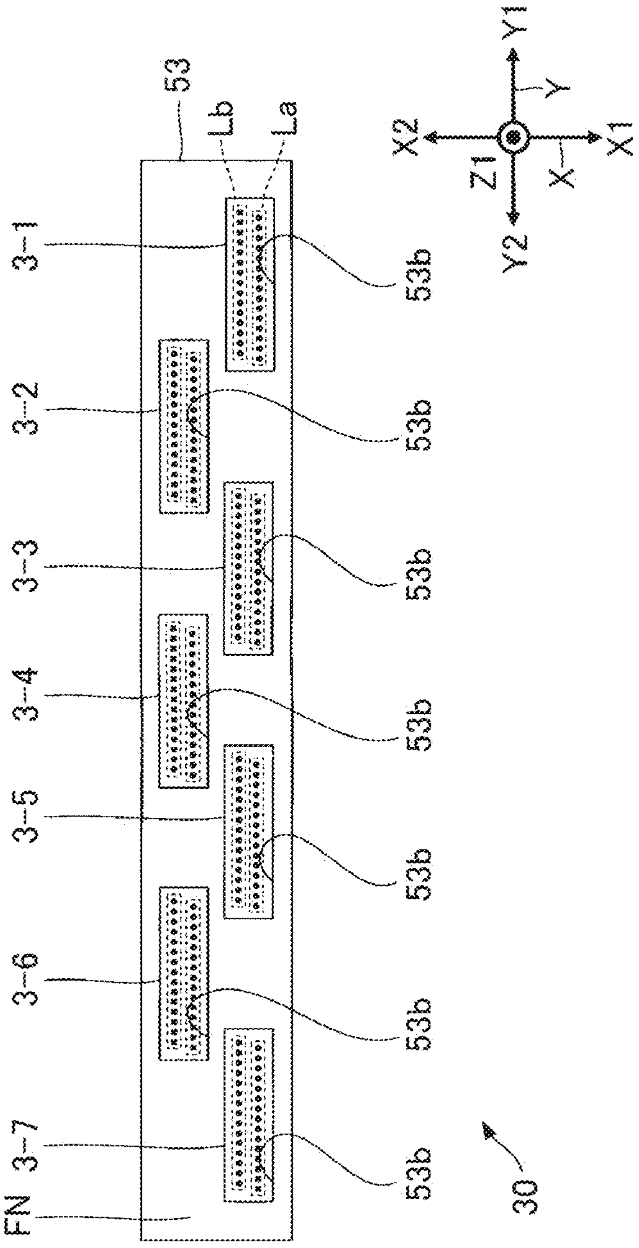
FIG. 6 is a schematic diagram of a lower surface of the liquid ejection head of the first embodiment.

FIG. 4 is a top view of the liquid ejection head 30 of the first embodiment. FIG. 5 is a cross-sectional view taken along a line V-V in FIG. 4. FIG. 6 is a schematic diagram of a lower surface of the liquid ejection head 30 of the first embodiment. In FIG. 4, FIG. 5, and FIG. 6, the liquid ejection head 30 having head chips 3-1 to 3-7 is schematically illustrated. The head chips 3-1 to 3-7 are each the head chips 3 described above. Hereinafter, each of the head chips 3-1 to 3-7 may be referred to as the head chip 3.

The liquid ejection head 30 includes the head chips 3-1 to 3-7, a flow channel structure 52, and a support member 53.

The head chips 3-1 to 3-7 are disposed in a staggered manner along the Y2 direction when viewed in a direction along the Z-axis. The head chips 3-1, 3-3, 3-5, and 3-7 are lined up in this order in the Y2 direction. The head chips 3-1, 3-3, 3-5, and 3-7 are disposed so that their positions are aligned with each other in the direction along the X-axis. In addition, the head chips 3-2, 3-4, and 3-6 are lined up in this order in the Y2 direction. The head chips 3-2, 3-4, and 3-6 are disposed further in the X2 direction than the head chips 3-1, 3-3, 3-5, and 3-7, and are aligned with each other in the direction along the X-axis.

The flow channel structure 52 is a structure within which a flow channel Pa is provided for supplying ink from the liquid container 10 to the plurality of head chips 3. The flow channel structure 52 includes, for example, a resin material or a metal material, or the like. A plurality of pipe sections **52*d* is provided in the flow channel structure 52. Each of the plurality of pipe sections 52*d* protrudes from the flow channel structure 52** toward the Z1 direction.

The flow channel Pa includes a common flow channel Pa1, a plurality of branching flow channels Pa2, and a plurality of openings HL. The common flow channels Pa1 and the plurality of branching flow channels Pa2 are formed in the flow channel structure 52. The plurality of openings HL is formed in a one-to-one correspondence with the plurality of pipe sections **52*d***.

The common flow channel Pa1 is a flow channel provided to be common to the plurality of head chips 3. Specifically, the common path Pa1 includes a flow channel provided in common to the head chips 3-1, 3-3, 3-5, and 3-7, and a flow channel provided in common to the head chips 3-2, 3-4, and 3-6. Each of these flow channels extend in the direction along the Y-axis, and both ends of each of the flow channels communicate to the opening HL facing in the Z2 direction. The ink from the liquid container 10 is introduced into the opening HL.

The plurality of branching flow channels Pa2 is provided for each of the supply ports 361 of the head chips 3-1 to 3-7. Each of the plurality of branching flow channels Pa2 communicates to the corresponding supply port 361.

The support member 53 is a member directly and commonly supporting the plurality of head chips 3. The support member 53 is disposed on a surface of the flow channel structure 52 facing the Z1 direction, and is connected to the flow channel structure 52. The support member 53 includes a frame portion 531 and a fixing plate 532.

The frame portion 531 has a plurality of concave portions **53*a* that houses the plurality of head chips 3. The plurality of concave portions 53*a* is a recess provided on a surface of the frame portion 531 facing the Z1 direction. Note that the plurality of concave portions 53*a* may be provided on each of the head chips 3 or may be provided for each group of two or more head chips 3. For example, the plurality of concave portions 53*a*** is formed by dividing one concave portion into a plurality of sections.

The fixing plate 532 is disposed on the surface of the frame portion 531 facing the Z1 direction, and is connected to the frame portion 531. The fixing plate 532 is a plate-like member for fixing the plurality of head chips 3. The head chips 3 are housed in a housing space defined by the fixing plate 532 and the concave portions **53*a* of the frame portion 531**.

A plurality of exposed openings **53*b* is provided on the fixing plate 532, the plurality of exposed openings 53*b* exposing the nozzle plate 37 of each of the head chips 3 to outside of the liquid ejection head 30. Each of the exposed openings 53*b* is a hole formed on the fixing plate 532. The plurality of exposed openings 53*b* is individually provided for each of the head chips 3. Each of the exposed openings 53*b* exposes a plurality of nozzles of the nozzle plate 37 of each of the head chips 3. The surface of the fixing plate 532 of the liquid ejection head 30 facing the Z1 direction constitutes an ejection surface FN together with the nozzle plate 37 exposed from the exposed opening 53*b*. As illustrated in FIG. 3, in the present embodiment, the exposed openings 53*b* are formed so as to overlap with the plurality of nozzles N of the nozzle plate 37. A part of the fixing plate 532 overlaps with an outer periphery of the nozzle plate 37** when viewed in the Z1 direction. Note that the exposed opening 53*b* may overlap with an entire region of the nozzle plate 37 in a planar view. That is, the entire nozzle plate 37 may be exposed from the exposed opening 53*b*.

Such a support member 53 includes, for example, a metal material such as stainless steel, titanium, and magnesium alloy, or a resin material. Note that the fixing plate 532 and the frame portion 531 include separate members, but may be integrally formed. In addition, a part of the support member 53 may be integrally formed with the flow channel structure 52. For example, the frame portion 531 may be integrally formed with the flow channel structure 52.

1-4. Overlapping Region of Head Chip 3

Figure 7:
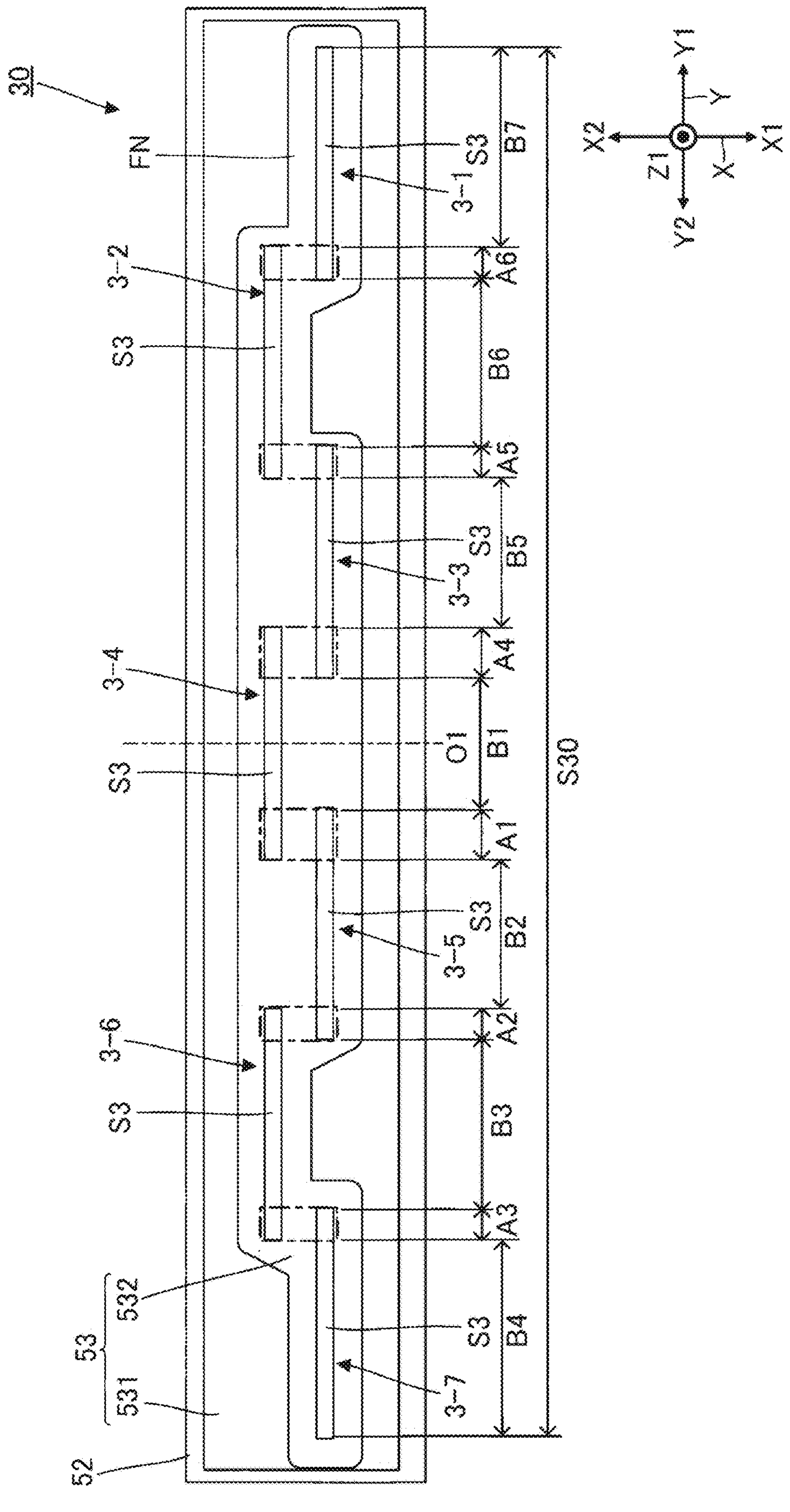
FIG. 7 is a bottom view of the liquid ejection head of the first embodiment.

FIG. 7 is a bottom view of the liquid ejection head 30 of the first embodiment.

As illustrated in FIG. 7, the ejection surface FN of the liquid ejection head 30 includes a total nozzle forming region S30 including all nozzle forming regions S3 of the plurality of head chips 3. The nozzle forming region S3 is a region extending from the nozzle N disposed at one end in the Y1 direction to the nozzle N disposed on the other end, among the plurality of nozzles N formed in one head chip 3. Note that FIG. 7 omits illustration of the nozzle N is omitted, and illustrates the nozzle forming regions S3. In addition, the total nozzle forming region S30 is a region, with respect to the Y1 direction, which extends from an end of the nozzle forming region S3 of the head chip 3-1 in the Y1 direction to an end of the nozzle forming region S3 of the head chip 3-7 in the Y2 direction. Further, in the present embodiment, a size of each of the nozzle forming regions S3 of the plurality of head chips 3, that is, a length in a direction along the Y-axis, is approximately the same as each other. Note that approximately the same size refers to a difference between two being 1% or less when the size of the nozzle forming region S3 of one head chip 3 is 100%.

As described above, the plurality of head chips 3 is disposed in a staggered manner along the Y1 direction, and four or more are provided. In the illustrated example, seven head chips 3 are provided. Then, the plurality of head chips 3 is disposed so as to have an overlapping region A where a part of the nozzle forming region S3 of one head chip 3 of adjacent head chips 3 and a part of the nozzle forming region S3 of the other head chip 3 overlap when viewed in the X1 direction. Thus, the overlapping region A exists between the adjacent head chips 3. Therefore, the plurality of head chips 3 includes a plurality of overlapping regions A. Note that the Y1 direction and the X1 direction are directions that are parallel to the nozzle forming regions S3 and perpendicular to the Z1 direction, which is the ink ejection direction.

The plurality of overlapping regions A includes a first overlapping region A1, a second overlapping region A2, a third overlapping region A3, a fourth overlapping region A4, a fifth overlapping region A5, and a sixth overlapping region A6.

The first overlapping region A1 is the overlapping region A where a part of the nozzle forming region S3 of the head chip 3-4 and a part of the nozzle forming region S3 of the head chip 3-5 overlap when viewed in the X1 direction. Among the plurality of overlapping regions A, the first overlapping region A1 is closest to a center position O1. The center position O1 is a center position of the total nozzle forming region S30 with respect to the Y1 direction.

The second overlapping region A2 is the overlapping region A where a part of the nozzle forming region S3 of the head chip 3-5 and a part of the nozzle forming region S3 of the head chip 3-6 overlap when viewed in the X1 direction. The second overlapping region A2 is farther away from the center position O1 than the first overlapping region A1. In the present embodiment, the second overlapping region A2 is provided in the Y2 direction with respect to the first overlapping region A1. In addition, the second overlapping region A2 is disposed between the first overlapping region A1 and the third overlapping region A3, to be described below, with respect to the Y1 direction. In addition, a size of the second overlapping region A2, that is, the length in the direction along the Y-axis, is smaller than a size of the first overlapping region A1, that is, the length in the direction along the Y-axis.

The third overlapping region A3 is the overlapping region A where a part of the nozzle forming region S3 of the head chip 3-6 and a part of the nozzle forming region S3 of the head chip 3-7 overlap when viewed in the X1 direction. The third overlapping region A3 is farther away from the center position O1 than the first overlapping region A1 and the second overlapping region A2. The third overlapping region A3 is disposed so as to sandwich the second overlapping region A2 with the first overlapping region A1, with respect to the Y1 direction. In the present embodiment, the third overlapping region A3 is located furthest in the Y2 direction among the plurality of overlapping regions A. A size of the third overlapping region A3, that is, the length in the direction along the Y-axis, is smaller than the size of the first overlapping region A1 with respect to the Y1 direction. In addition, in the present embodiment, the size of the third overlapping region A3 is approximately the same as the length of the second overlapping region A2 in the direction along the Y-axis. Note that approximately the same size refers to a difference between the two being 1% or less when the size of the nozzle forming region S3 of one head chip 3 is 100%.

The fourth overlapping region A4 is the overlapping region A where a part of the nozzle forming region S3 of the head chip 3-4 and a part of the nozzle forming region S3 of the head chip 3-3 overlap when viewed in the X1 direction. The fourth overlapping region A4 is disposed so as to sandwich the center position O1 with the first overlapping region A1. In the present embodiment, a distance between the fourth overlapping region A4 and the center position O1 is approximately the same as a distance between the first overlapping region A1 and the center position O1. Thus, similarly to the first overlapping region A1, the fourth overlapping region A4 is closest to the center position O1 among the plurality of the overlapping regions A. In addition, a size of the fourth overlapping region A4, that is, the length in the direction along the Y-axis, is approximately the same as the size of the first overlapping region A1.

The fifth overlapping region A5 is the overlapping region A where a part of the nozzle forming region S3 of the head chip 3-3 and a part of the nozzle forming region S3 of the head chip 3-2 overlap when viewed in the X1 direction. The fifth overlapping region A5 is farther away from the center position O1 than the first overlapping region A1 and the fourth overlapping region A4. In the present embodiment, the fifth overlapping region A5 is provided in the Y1 direction relative to the fourth overlapping region A4. In addition, the fifth overlapping region A5 is disposed between the fourth overlapping region A4 and the sixth overlapping region A6 to be described below, with respect to the Y1 direction. In addition, a size of the fifth overlapping region A5, that is, the length in the direction along the Y-axis, is smaller than the size of the fourth overlapping region A4.

The sixth overlapping region A6 is the overlapping region A where a part of the nozzle forming region S3 of the head chip 3-2 and a part of the nozzle forming region S3 of the head chip 3-1 overlap when viewed in the X1 direction. The sixth overlapping region A6 is farther away from the center position O1 than the fourth overlapping region A4 and the fifth overlapping region A5. The sixth overlapping region A6 is disposed so as to sandwich the fifth overlapping region A5 with the fourth overlapping region A4, with respect to the Y1 direction. In the present embodiment, the sixth overlapping region A6 is located furthest in the Y1 direction among the plurality of the overlapping regions A. A size of the sixth overlapping region A6, that is, the length in the direction along the Y-axis, is smaller than the size of the fourth overlapping region A4, with respect to the Y1 direction. In addition, in the present embodiment, the size of the sixth overlapping region A6 is approximately the same as the length of the fifth overlapping region A5 with respect to the Y-axis.

Note that the fourth overlapping region A4, the fifth overlapping region A5, and the sixth overlapping region A6 may be considered the first overlapping region A1, the second overlapping region A2, and the third overlapping region A3. In addition, the number of the head chips 3 only has to be 4 or larger, and may be equal to or larger than 5, 6, or 8.

In addition, in each of the overlapping regions A, some nozzles N belonging to the nozzle forming region S3 of the one head chip 3 of the two adjacent head chips 3 and some nozzles N belonging to the nozzle forming region S3 of other head chip 3 overlap for each nozzle row L when viewed in the X1 direction.

In addition, each head chip 3 includes, among the nozzle forming regions S3, a non-overlapping region B that does not overlap, when viewed in the X1 direction, with the nozzle forming region S3 of the other head chip 3 of the adjacent head chip 3. The non-overlapping region B is a region different from the overlapping region A. The non-overlapping region B includes a plurality of non-overlapping regions B1, B2, B3, B4, B5, B6, and B7.

The non-overlapping region B1 is a region of the nozzle forming region S3 of the head chip 3-4 that is different from the first overlapping region A1 and the fourth overlapping region A4. The non-overlapping region B1 is a remaining region of the nozzle forming region S3 of the head chip 3-4, excluding the first overlapping region A1 and the fourth overlapping region A4. In the present embodiment, a size of the non-overlapping region B1, that is, the length in the direction along the Y-axis, is equal to or more than half the size of the nozzle forming region S3 of the head chip 3-4. The size of the non-overlapping region B1 is larger than the size of each of the first overlapping region A1 and the fourth overlapping region A4.

The non-overlapping region B2 is a region of the nozzle forming region S3 of the head chip 3-5 that is different from the first overlapping region A1 and the second overlapping region A2. The non-overlapping region B2 is a remaining region of the nozzle forming region S3 of the head chip 3-5, excluding the first overlapping region A1 and the second overlapping region A2. In the present embodiment, a size of the non-overlapping region B2, that is, the length in the direction along the Y-axis, is equal to or more than half the size of the nozzle forming region S3 of the head chip 3-5. The size of the non-overlapping region B2 is larger than the size of each of the first overlapping region A1 and the second overlapping region A2.

The non-overlapping region B3 is a region of the nozzle forming region S3 of the head chip 3-6 that is different from the second overlapping region A2 and the third overlapping region A3. The non-overlapping region B3 is a remaining region of the nozzle forming region S3 of the head chip 3-6, excluding the second overlapping region A2 and the third overlapping region A3. In the present embodiment, a size of the non-overlapping region B3, that is, the length in the direction along the Y-axis, is equal to or more than half the size of the nozzle forming region S3 of the head chip 3-6. The size of the non-overlapping region B3 is larger than the size of each of the second overlapping region A2 and the third overlapping region A3.

The non-overlapping region B4 is a region of the nozzle forming region S3 of the head chip 3-7 that is different from the third overlapping region A3. The non-overlapping region B4 is a remaining region of the nozzle forming region S3 of the head chip 3-7, excluding the third overlapping region A3. In the present embodiment, a size of the non-overlapping region B4, that is, the length in the direction along the Y-axis, is equal to or more than half the size of the nozzle forming region S3 of the head chip 3-7. The size of the non-overlapping region B4 is larger than the size of the third overlapping region A3.

The non-overlapping region B5 is a region of the nozzle forming region S3 of the head chip 3-3 that is different from the fourth overlapping region A4 and the fifth overlapping region A5. The non-overlapping region B5 is a remaining region of the nozzle forming region S3 of the head chip 3-3, excluding the fourth overlapping region A4 and the fifth overlapping region A5. In the present embodiment, a size of the non-overlapping region B5, that is, the length in the direction along the Y-axis, is equal to or more than half the size of the nozzle forming region S3 of the head chip 3-3. The size of the non-overlapping region B5 is larger than the size of each of the fourth overlapping region A4 and the fifth overlapping region A5.

The non-overlapping region B6 is a region of the nozzle forming region S3 of the head chip 3-2 that is different from the fifth overlapping region A5 and the sixth overlapping region A6. The non-overlapping region B6 is a remaining region of the nozzle forming region S3 of the head chip 3-2, excluding the fifth overlapping region A5 and the sixth overlapping region A6. In the present embodiment, a size of the non-overlapping region B6, that is, the length in the direction along the Y-axis, is equal to or more than half the size of the nozzle forming region S3 of the head chip 3-2. The size of the non-overlapping region B6 is larger than the size of each of the fifth overlapping region A5 and the sixth overlapping region A6.

The non-overlapping region B7 is a region of the nozzle forming region S3 of the head chip 3-1 that is different from the sixth overlapping region A6. The non-overlapping region B7 is a remaining region of the nozzle forming region S3 of the head chip 3-1, excluding the sixth overlapping region A6. In the present embodiment, a size of the non-overlapping region B7, that is, the length in the direction along the Y-axis, is equal to or more than half the size of the nozzle forming region S3 of the head chip 3-1. The size of the non-overlapping region B7 is larger than the size of the sixth overlapping region A6.

Figure 8:
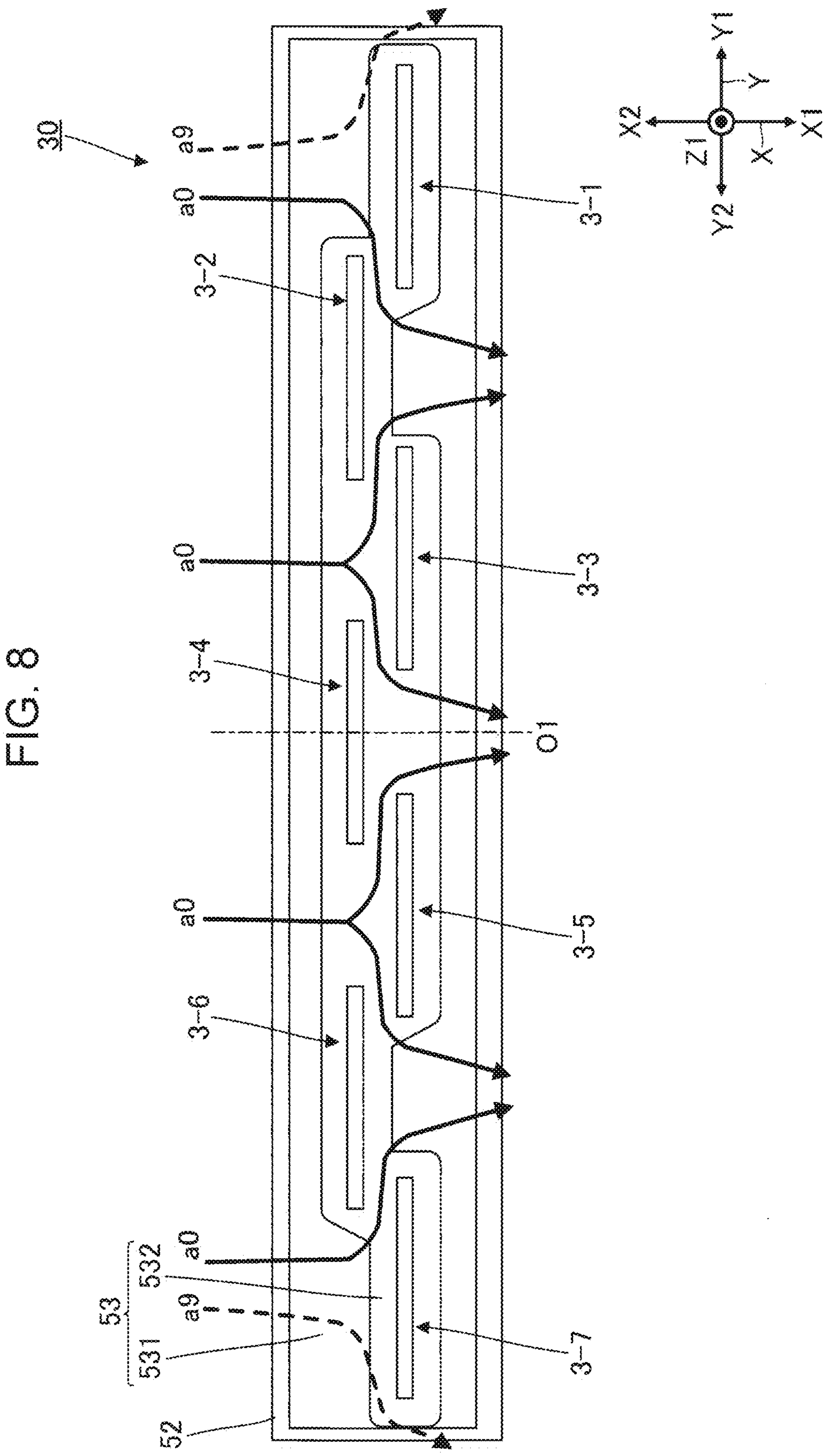
FIG. 8 is a diagram exemplifying flow of air currents in a plurality of head chips.

FIG. 8 is a diagram exemplifying flow of air currents generated around the plurality of head chips 3. In the liquid ejection head 30, there is a risk that ink droplets may not land on a target location of the medium M due to the air currents.

As illustrated in FIG. 8, there is a plurality of gaps among the plurality of head chips 3. This causes air currents to escape through the plurality of gaps. As depicted by a solid arrow a0 in FIG. 8, the air currents escape through the plurality of gaps of the plurality of head chips 3. There is a risk that the escape of the air currents may result in landing deviations among the plurality of head chips 3. For example, transport of the medium M generates the air currents.

For example, when all the nozzles N eject in a solid manner, ink droplets to be ejected from the seven head chips 3 form a curtain in accordance with a shape of the nozzle rows L arranged in the Y1 direction, thus obstructing flow of the air currents. For example, the liquid ejection head 30 of the present embodiment is a line head. In this case, the ink droplets obstruct the flow of the air currents generated toward the X1 direction by the transport of the medium M.

However, with respect to the Y1 direction, for the head chips 3-1 and 3-7 located on both sides of the total nozzle forming region S30, air currents escape through a location where there are no adjacent chips. That is, the air currents escape as depicted by a dashed arrow a9 in FIG. 8. As a result, vicinity of the head chips 3-1 and 3-7 is less susceptible to the landing deviations than the head chip 3-4 that is closest to the center position O1.

In addition, with respect to the Y1 direction, an airflow velocity becomes faster toward the center side of the total nozzle forming region S30, while it becomes slower toward both ends. This makes the center side more susceptible to the air currents, resulting in larger landing deviations, and makes both ends less susceptible to the air currents, resulting in smaller landing deviations. In this manner, the influence of the plurality of gaps among the plurality of head chips 3 results in a difference in landing deviations with respect to the Y1 direction. In the present embodiment, in order to reduce the difference, an overlap amount in the overlapping region A near the center position O1 is made larger than the overlap amount at both ends, considering that the landing deviations near the center position O1 are larger than the landing deviation at both ends.

Specifically, as described above, with respect to the Y1 direction, the size of the first overlapping region A1 is larger than the second overlapping region A2. Therefore, as compared to a case in which the plurality of overlapping regions A has the same size as each other, it is possible to suppress deterioration in the print quality due to differences in the landing deviations among the plurality of head chips 3.

Note that a similar issue exists if the liquid ejection head 30 is a serial head rather than a line head. For example, when the liquid ejection head 30 is a serial head, ink droplets obstruct air currents generated by movement of a carriage, which supports and reciprocates the liquid ejection head 30, in a direction in which the total nozzle forming region S30 extends, that is, a direction perpendicular to a direction in which the plurality of head chips 3 is arranged in a staggered manner. Even in such a case, the size of the first overlapping region A1 is larger than the size of the second overlapping region A2, so that it is possible to suppress the deterioration in the print quality due to differences in the landing deviations among the plurality of head chips 3, as compared to the case in which the plurality of overlapping regions A has the same size as each other.

Figure 9:
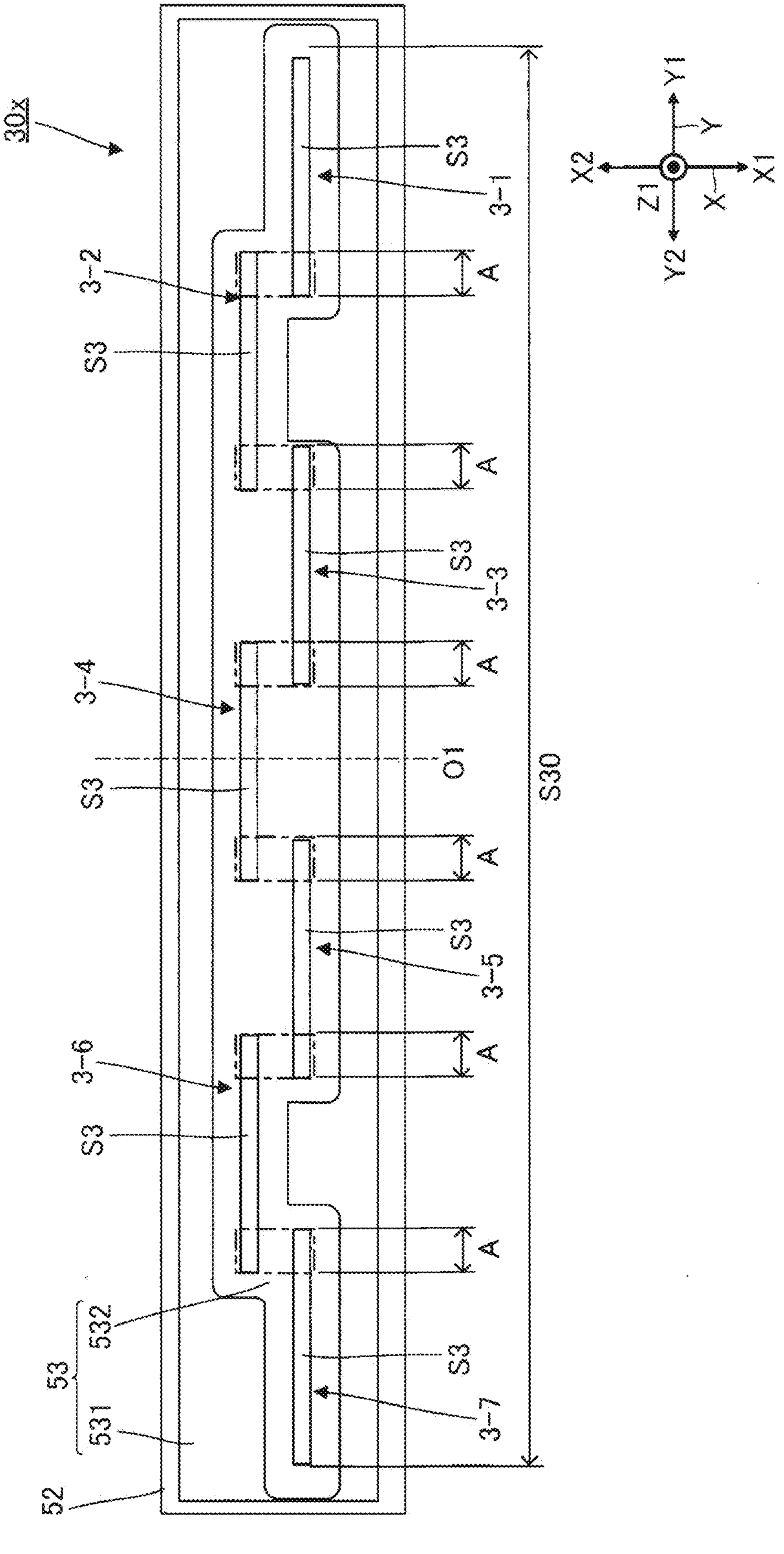
FIG. 9 is a bottom view of a liquid ejection head of a comparative example.

FIG. 9 is a bottom view of a liquid ejection head 30*x* of a comparative example. As illustrated in FIG. 9, in the existing liquid ejection head 30*x*, sizes of the plurality of overlapping regions A are approximately the same as each other. In such a liquid ejection head 30*x*, there occurs a difference in landing deviations in the total nozzle forming region S30, with respect to the Y1 direction. This results in a risk of deterioration in the print quality.

Figure 21:
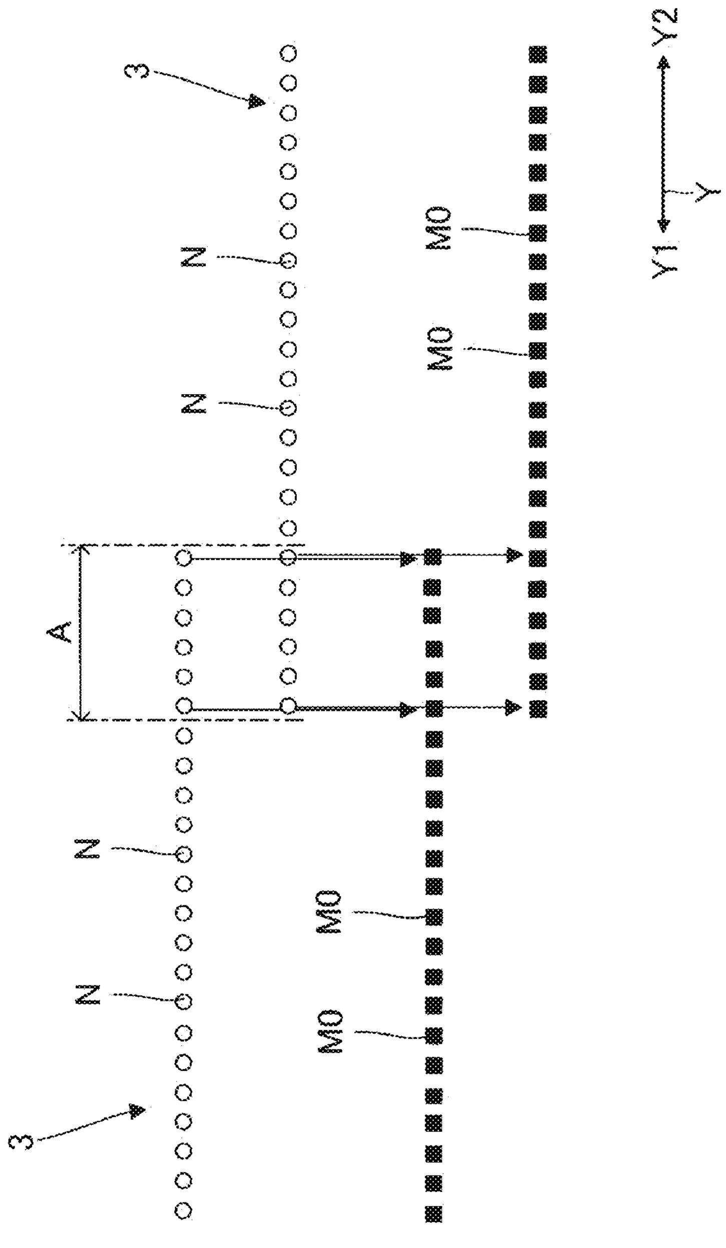
FIG. 21 is a diagram for explaining landing of ink droplets when there is no influence of air currents.
Figure 22:
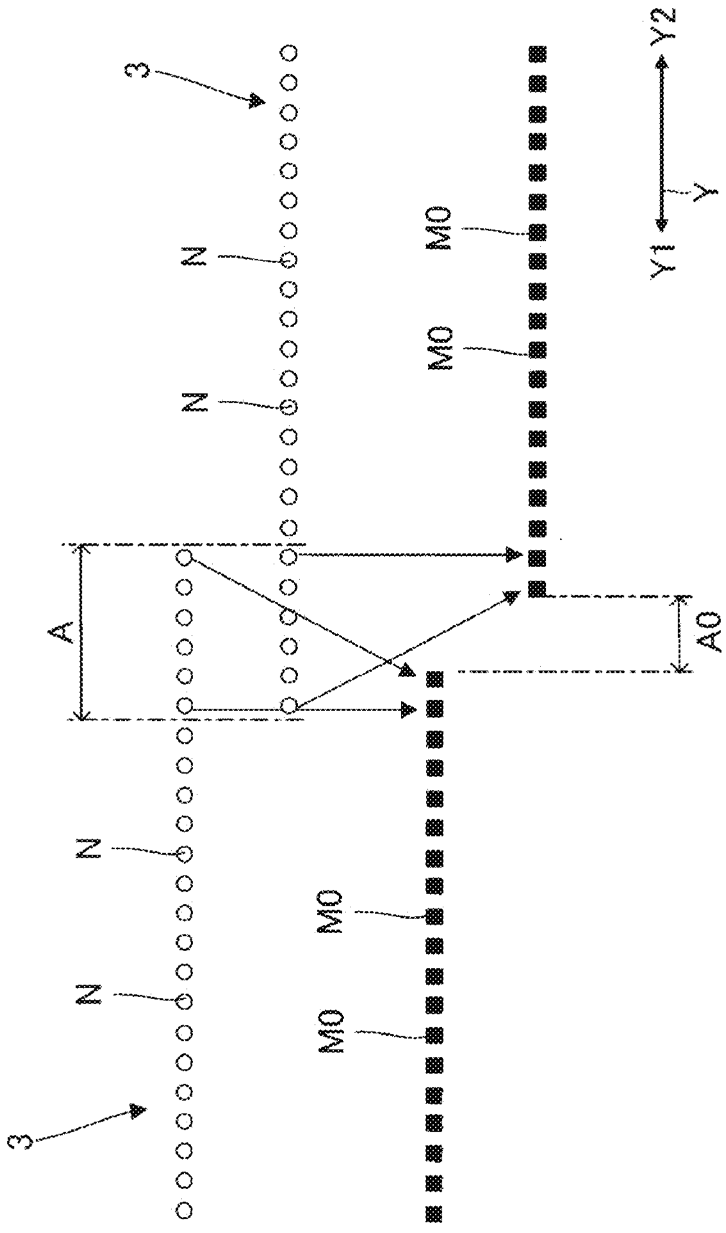
FIG. 22 is a diagram for explaining landing of ink droplets when there is influence of air currents.

FIG. 21 is a diagram for explaining landing of ink droplets when there is no influence of air currents. FIG. 22 is a diagram for explaining landing of ink droplets MO when there is influence of air currents. Note that FIG. 21 and FIG. 22 illustrate the nozzle row La of each of the head chips 3 as a representative.

As illustrated in FIG. 21, when not affected by the air currents, ideally, the ink droplets MO are ejected directly below the nozzle N. Since the adjacent head chips 3 have the overlapping region A, no white streaks are generated on the corresponding medium M between the adjacent head chips 3.

In contrast to this, as illustrated in FIG. 22, when affected by the air currents, the ink droplets MO are not ejected directly below the nozzle N, and the ink droplets MO move to the center side of the nozzle row La. As a result of this, a region A0 is generated on the medium M where no ink droplets are ejected. This region A0 appears as white streaks on the medium M.

Figure 10:
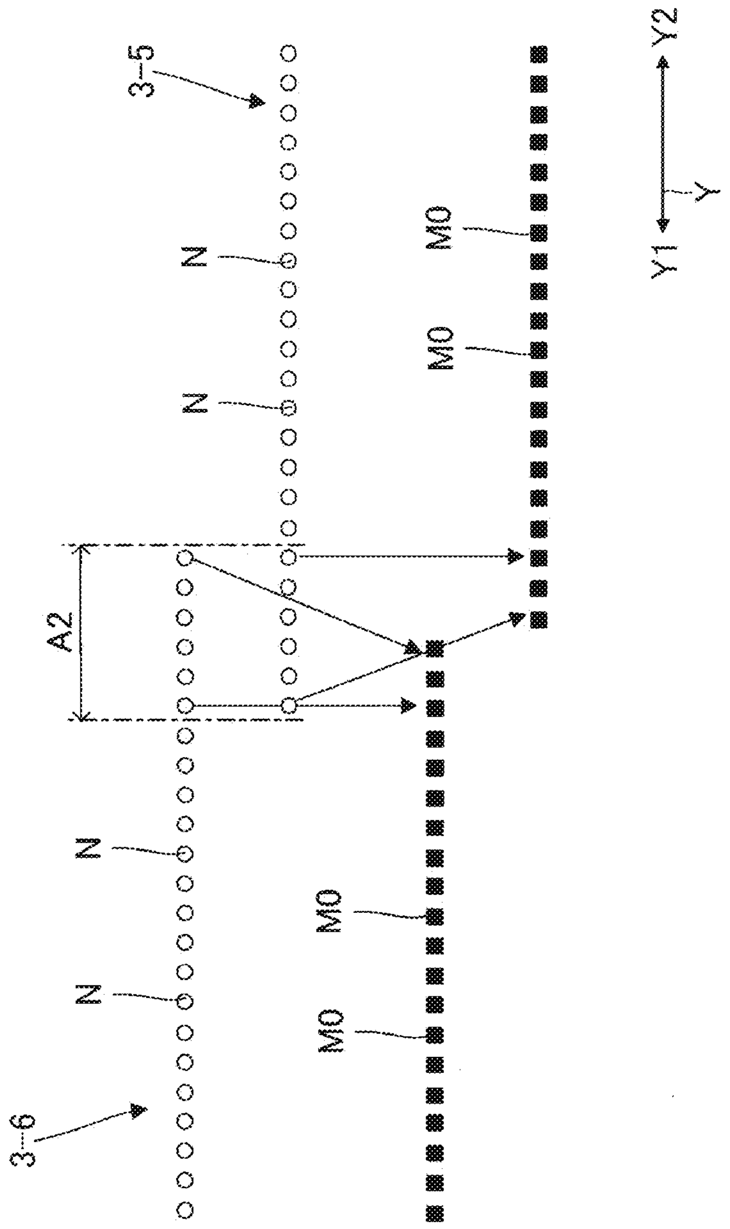
FIG. 10 is a diagram for explaining landing of ink droplets in a second overlapping region.
Figure 11:
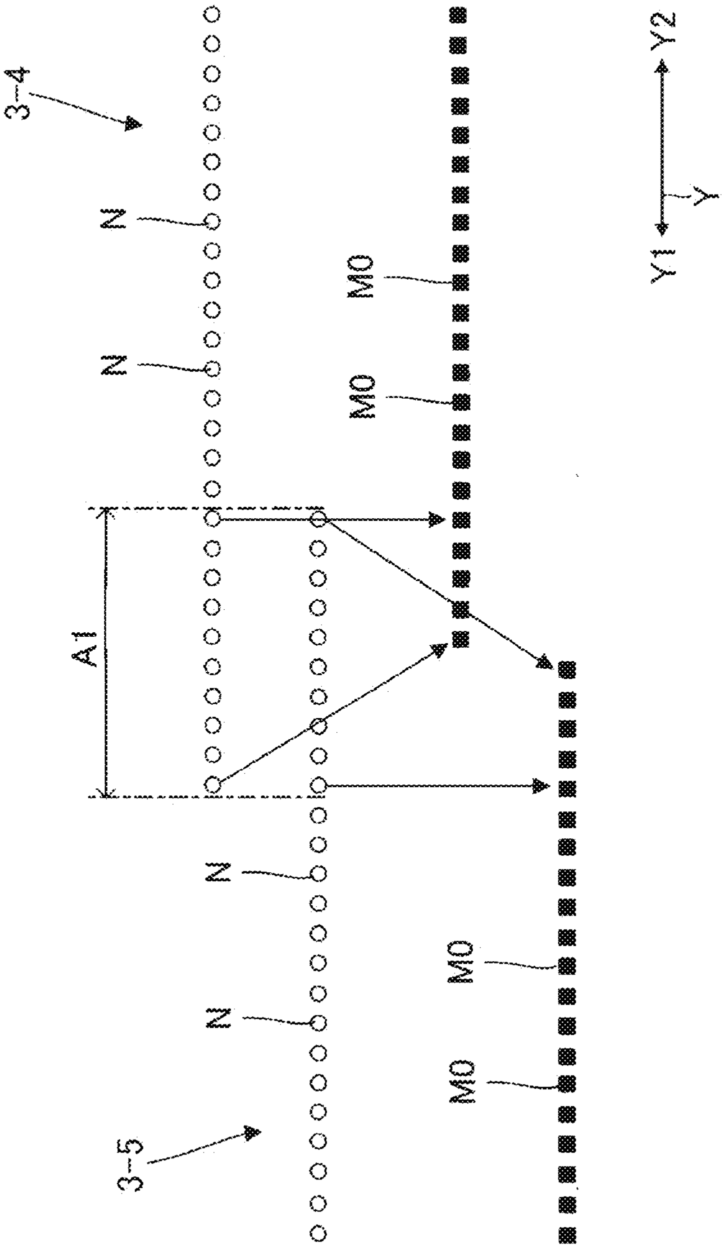
FIG. 11 is a diagram for explaining landing of ink droplets in a first overlapping region.

FIG. 10 is a diagram for explaining landing of the ink droplets MO in the second overlapping region A2. FIG. 11 is a diagram for explaining landing of the ink droplets MO in the first overlapping region A1. Note that FIG. 10 and FIG. 11 illustrate the nozzle row La of each of the head chips 3 as a representative.

As illustrated in FIG. 10 and FIG. 11, there is a risk that due to the influence of the air currents as described above, the ink droplets MO ejected from some of the nozzles N located near the ends of the one nozzle row La may move to the center side of the nozzle row La.

A space between the head chip 3-5 and the head chip 3-6 is provided on the side of the end of the liquid ejection head 30, as compared to a space between the head chip 3-4 and the head chip 3-5. Therefore, the space between the head chip 3-5 and the head chip 3-6 is less susceptible to the air currents than the space between the head chip 3-4 and the head chip 3-5. Consequently, although the size of the second overlapping region A2 is smaller than the size of the first overlapping region A1, white streaks are less likely to be generated. On the other hand, air currents easily escape from the space between the head chip 3-4 and the head chip 3-5. For this reason, the size of the first overlapping region A1 is made larger than the size of the second overlapping region A2. This can suppress the risk that white streaks are generated on the medium M even if a large landing deviation of the ink droplets MO is caused due to the influence of the air currents in the space between the head chip 3-4 and the head chip 3-5.

Note that the nozzle rows Lb of the adjacent head chips 3 also have overlapping parts when viewed in the X1 direction, similarly to the nozzle rows La.

In addition, as illustrated in FIG. 7, the first overlapping region A1 is the overlapping region A that is closest to the center position O1, with respect to the Y1 direction, among the plurality of overlapping regions A. In this case, the first overlapping region A1 being larger than the second overlapping region A2, it is possible to effectively suppress the deterioration in the print quality due to the differences in landing deviations between the plurality of head chips 3.

With respect to the Y1 direction, the size of the first overlapping region A1 may be equal to or more than twice an average size of the plurality of overlapping regions A. If the size of the first overlapping region A1 is equal to or more than twice the average size of the plurality of overlapping regions A, white streaks is less likely to be generated even when ink droplets are affected by relatively large air currents in the first overlapping region A1, compared to a case in which the size of the first overlapping region A1 is less than twice the average size of the plurality of overlapping regions A.

From another perspective, the number of nozzles belonging to the first overlapping region A1 may be equal to or more than twice the average number of nozzles belonging to the plurality of the overlapping regions A. For example, a case is considered in which the number of nozzles in each of the first overlapping region A1 and the fourth overlapping region A4 is 64, for example, and in which the number of nozzles in each of the second overlapping region A2, the third overlapping region A3, the fifth overlapping region A5, and the sixth overlapping region A6 is 9. In this case, an average number of nozzles belonging to the plurality of overlapping regions A is approximately 27. Therefore, twice the average is approximately 54. If the number of nozzles belonging to the first overlapping region A1 is equal to or more than twice the average number of nozzles belonging to the plurality of overlapping regions A, an effect of the first overlapping region A1 being larger than the second overlapping region A2 is produced more prominently than a case in which the number of nozzles belonging to the first overlapping region A1 is less than twice the average number of nozzles belonging to the plurality of overlapping regions A.

Note that the size of the first overlapping region A1 may be less than twice an average size of the plurality of overlapping regions A. In addition, the number of nozzles belonging to the first overlapping region A1 may be less than twice the average number of nozzles belonging to the plurality of overlapping regions A.

In addition, with respect to the Y1 direction, the size of the second overlapping region A2 may be equal to or less than ½ the average size of the plurality of overlapping regions A. When the size of the second overlapping region A2 exceeds ½ the average size of the plurality of overlapping regions A, the effect of the first overlapping region A1 being larger than the second overlapping region A2 becomes weaker than when the size of the second overlapping region A2 is equal to or less than ½ the average size of the plurality of overlapping regions A.

From another perspective, the number of nozzles belonging to the second overlapping region A2 may be equal to or more than ½ the average number of nozzles belonging to the plurality of the overlapping regions A. For example, a case is considered in which the number of nozzles in each of the first overlapping region A1 and the fourth overlapping region A4 is 64, for example, and in which the number of nozzles in each of the second overlapping region A2, the third overlapping region A3, the fifth overlapping region A5, and the sixth overlapping region A6 is 9. In this case, an average number of nozzles belonging to the plurality of overlapping regions A is approximately 27. Therefore, ½ the average is approximately 14. If the number of nozzles belonging to the second overlapping region A2 is equal to or less than ½ the average number of nozzles belonging to the plurality of overlapping regions A, the effect of the first overlapping region A1 being larger than the second overlapping region A2 is produced more prominently than a case in which the number of nozzles belonging to the second overlapping region A2 exceeds ½ the average number of nozzles belonging to the plurality of overlapping regions A.

In particular, with the respect to the Y1 direction, the size of the first overlapping region A1 may be equal to or more than twice the average size of the plurality of overlapping regions A and that with the respect to the Y1 direction, the size of the second overlapping region A2 may be equal to or less than ½ the average the average size of the plurality of overlapping regions A. When these relationships are satisfied, it is possible to particularly effectively suppress the deterioration in the print quality due to the differences in landing deviations among the plurality of head chips 3, as compared to a case in which the relationships are not satisfied.

Note that the size of the second overlapping region A2 may exceed ½ the average size of the plurality of overlapping regions A. In addition, the number of nozzles belonging to the second overlapping region A2 may exceeds ½ the average number of nozzles belonging to the plurality of overlapping regions A.

With respect to the Y1 direction, the size of the first overlapping region A1 may be 5 times or more the size of the second overlapping region A2. In addition, with respect to the Y1 direction, the size of the first overlapping region A1 may be 7 times or more the size of the second overlapping region A2.

With respect to the Y1 direction, a total size of the plurality of overlapping regions A is smaller than the size of the nozzle forming region S3 of the one head chip 3. The total size being smaller than the size of the nozzle forming region S3 makes it possible to avoid excessively increasing the number of nozzles included in the overlapping regions A and to suitably use the liquid ejection head 30 as a line head. Note that the total size may be larger than the size of the one nozzle forming region S3.

1-5. Support Member 53

Figure 12:
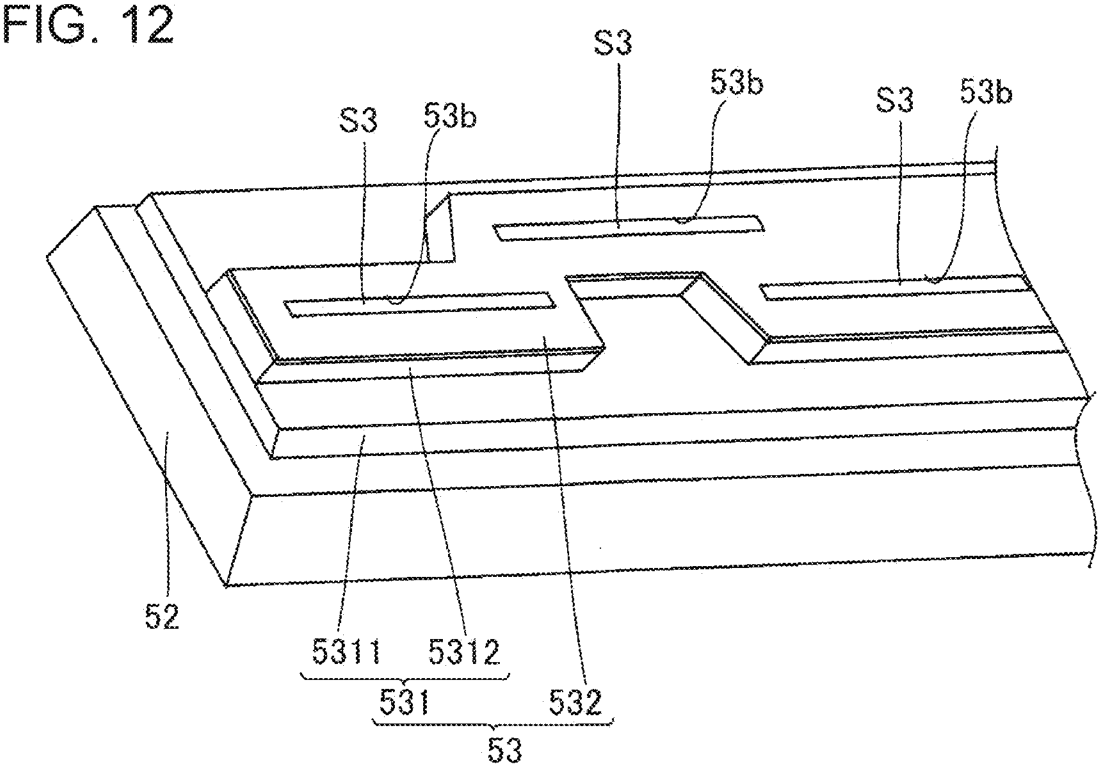
FIG. 12 is a perspective view of a part of a support member illustrated in FIG. 5.
Figure 13:
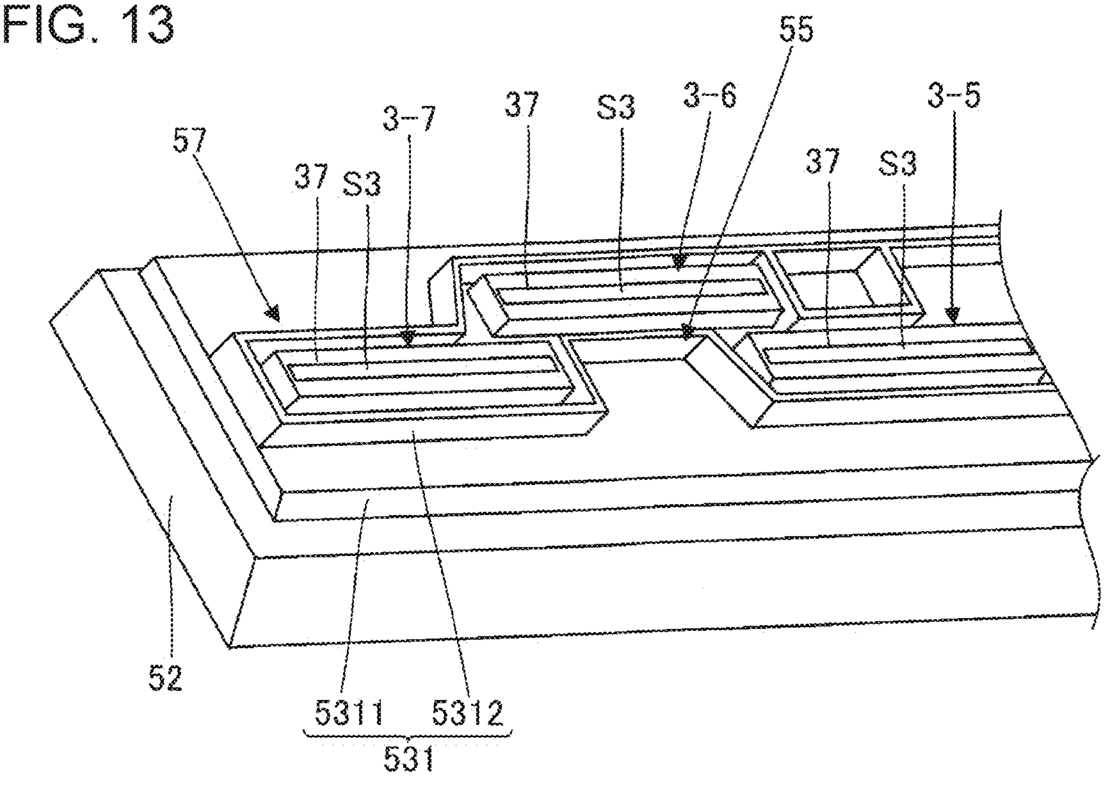
FIG. 13 is a diagram in which a fixing plate of the support member illustrated in FIG. 12 is removed.
Figure 14:
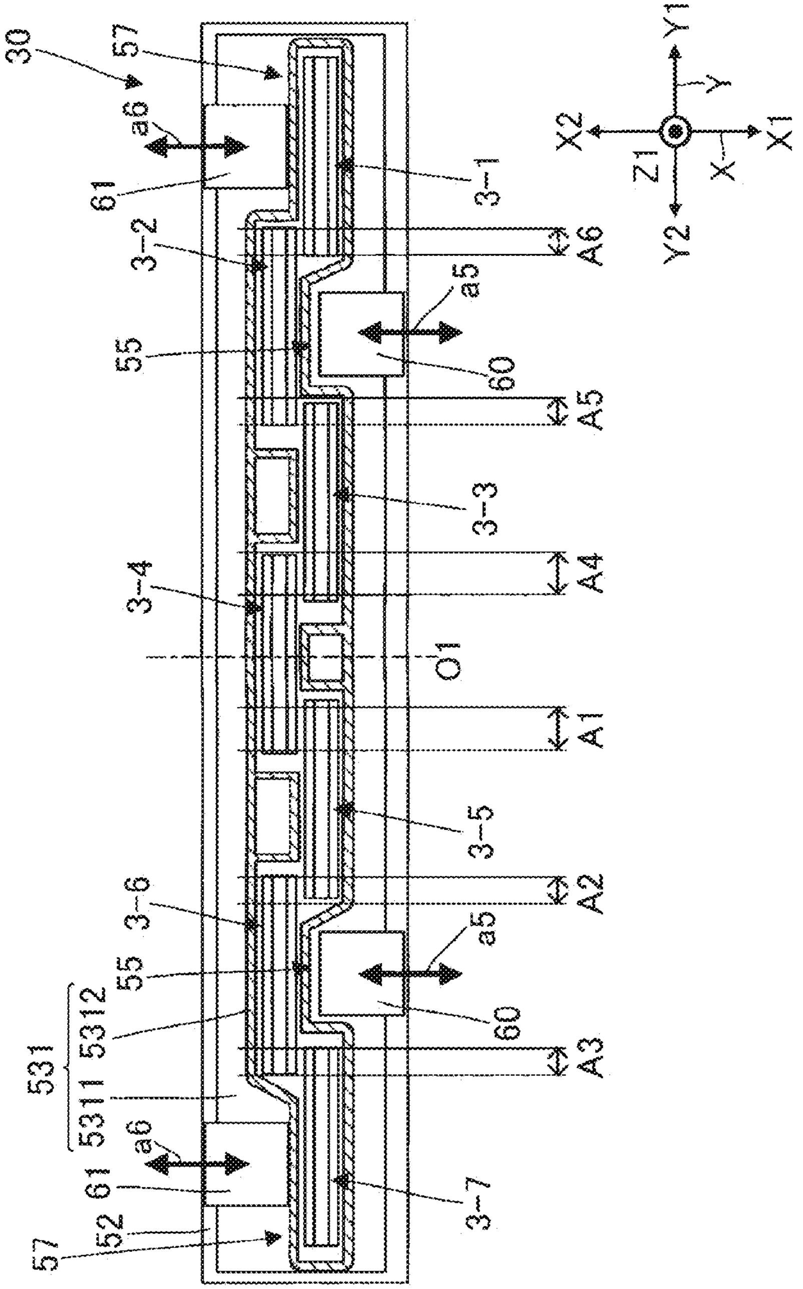
FIG. 14 is a bottom view of the support member illustrated in FIG. 13.

FIG. 12 is a perspective view of a part of the support member 53 illustrated in FIG. 5. FIG. 13 is a diagram in which the fixing plate 532 of the support member 53 illustrated in FIG. 12 is removed. FIG. 14 is a bottom view of the support member 53 illustrated in FIG. 13. FIG. 14 illustrates a state in which the fixing plate 532 is removed.

As illustrated in FIG. 12, the support member 53 includes the frame portion 531 and the fixing plate 532. As described above, the plurality of exposed openings **53*b* is provided on the fixing plate 532**.

As illustrated in FIG. 13 and FIG. 14, the frame portion 531 includes a base 5311, and a frame body 5312. The base 5311 is a portion to be connected to the flow channel structure 52. The frame body 5312 is provided on a surface facing the Z1 direction of the base 5311. A through-hole is provided in the frame body 5312. An inner wall surface and the surface of the base 5311 in the Z1 direction constitute the above-described plurality of concave portions **53*a*. In the illustrated example, the plurality of concave portions 53*a* is partly connected to constitute one concave portion. In addition, a plurality of notches 55 and 57 is provided on the frame body 5312**.

Figure 15:
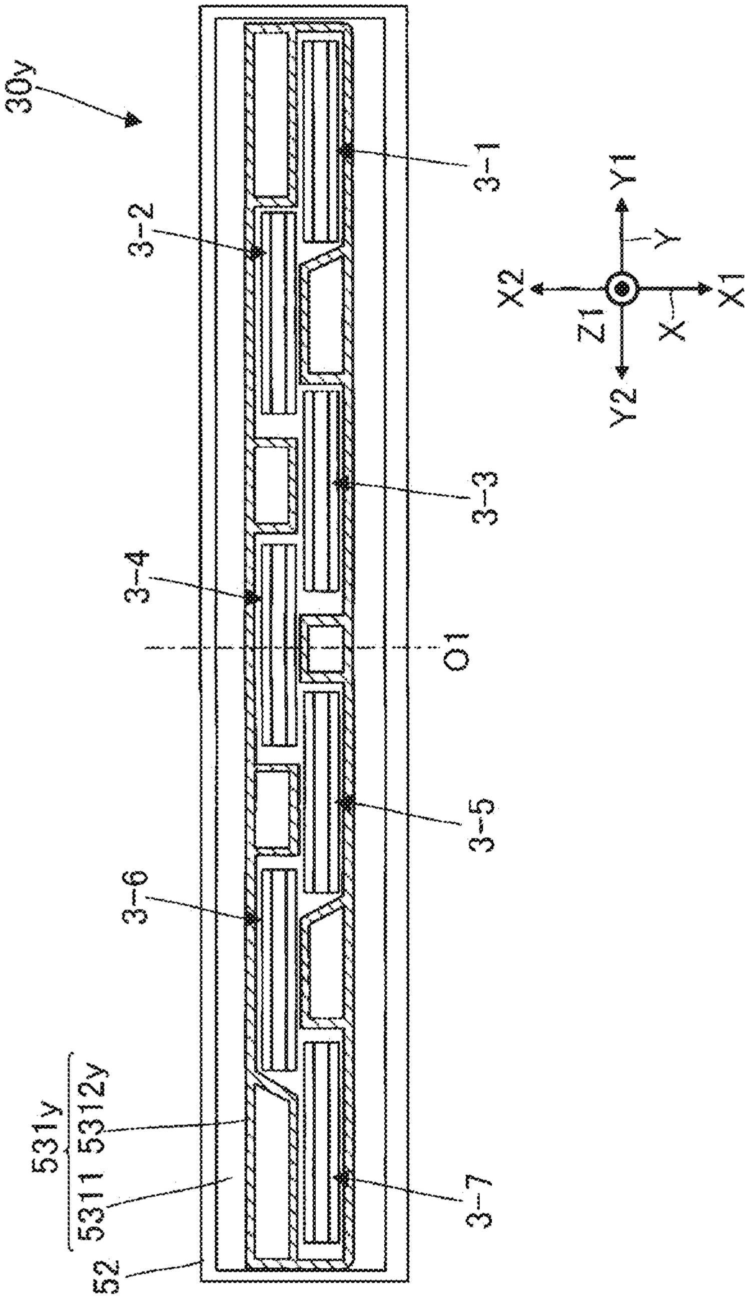
FIG. 15 is a bottom view of a frame portion of another example.

FIG. 15 is a bottom view of the support member 53 in a modification example. The plurality of notches 55 and 57 is not provided in a frame body **5312*y* of a frame portion 531*y* of a support member 53*y* illustrated in FIG. 15. On the other hand, the plurality of notches 55 and 57 is provided in the frame body 5312 of the present embodiment as illustrated in FIG. 14. Each of the notches 55 and 57 is formed by cutting out a portion of the frame body 5312*y* illustrated in FIG. 15**.

As described above, in the present embodiment, with respect to the Y1 direction, the first overlapping region A1 is larger than the second overlapping region A2. For this reason, a gap between the adjacent head chips 3 closer to the end than to the center position O1 can be made larger, with the respect to the Y1 direction. Therefore, the notch 55 can be provided closer to the end than to the center position O1. And, any component can be placed on the notch 55. For example, a temperature sensor or a heater, or the like, can be provided on the notch 55. This makes it possible to reduce the size of the liquid ejection head 30.

As illustrated in FIG. 14, in the present embodiment, one notch 55 is provided between the second overlapping region A2 and the third overlapping region A3 with respect to the Y1 direction. The other notch 55 is provided between the fifth overlapping region A5 and the sixth overlapping region A6 with respect to the Y1 direction. Therefore, the support member 53 has the notch 55 between the second overlapping region A2 and the third overlapping region A3 as well as between the fifth overlapping region A5 and the sixth overlapping region A6, respectively. Provision of the notch 55 in the frame body 5312 makes it possible to place the suppressing unit 60 in the notch 55, the suppressing unit 60 suppressing the floating of the medium M. This allows the suppressing unit 60 to be provided in the liquid ejection head 30. Therefore, there is no need to separately provide a member other than the liquid ejection head 30 for placing the suppressing unit 60. Consequently, it is possible to reduce the size of the liquid ejection apparatus 100. Moreover, provision of the notch 57 allows the suppressing unit 61 to be placed.

For example, as depicted by a double-headed arrow a5, the suppressing unit 60 is movable in the X1 direction and the X2 direction. Similarly, the suppressing unit 61 is movable in the X1 direction and the X2 direction, as depicted by a double-headed arrow a6. As a result, when the liquid ejection apparatus 100 is in use, by placing the suppressing units 60 and 61 in positions illustrated in FIG. 14, it is possible to suppress the floating of the medium M by means of the suppressing units 60 and 61. In addition, when the ejection surface FN of the liquid ejection head 30 is cleaned, the suppressing units 60 and 61 are moved in the X1 direction from the positions illustrated in FIG. 14. This allows for efficient cleaning of the ejection surface FN.

In addition, as illustrated in FIG. 14, the frame body 5312 of the support member 53 has no notch between the first overlapping region A1 and the second overlapping region A2. No notch being formed in such a location, rigidity of the support member 53 can be improved as compared to a case in which the notch is formed.

Moreover, as described above, the fourth overlapping region A4 is disposed so as to sandwich the center position O1 with the first overlapping region A1. With respect to the Y1 direction, the size of the first overlapping region A1 is approximately the same as that of the fourth overlapping region A4. Note that approximately the same size refers to a difference between the two being 1% or less when the size of the nozzle forming region of one head chip in the first direction is 100%. For example, approximately the same size indicates that the difference is 4 nozzles or less, which is 1% of the number of nozzles, when the number of nozzles included in the nozzle forming region S3 of one head chip in the first direction is 400.

The size of the first overlapping region A1 being approximately the same as that of the fourth overlapping region A4, a central portion of the total nozzle forming region S30 is configured to be a line-symmetric with respect to the center position O1. In the case of this line-symmetric configuration, the suppressing unit 60 being placed in the above-described notch 55, it is easy to stably fix the medium M by the suppressing unit 60. In particular, when the medium M is set so that a center line of the medium M in a transport direction corresponds to the center position O1, the suppressing unit 60 can support the medium M so that both ends of the medium M in the direction along the Y-axis do not float even when a width of the medium M is smaller than the total nozzle forming region S30.

In addition, as illustrated in FIG. 14, in the present embodiment, two notches 57 are formed at ends of the frame body 5312 in the Y1 direction and the Y2 direction. Then, the suppressing unit 61 is placed in each of the notches 57. This allows the suppressing unit 61 to support the medium M so that the both ends of the medium M do not float in the direction along the Y-axis.

Figure 16:
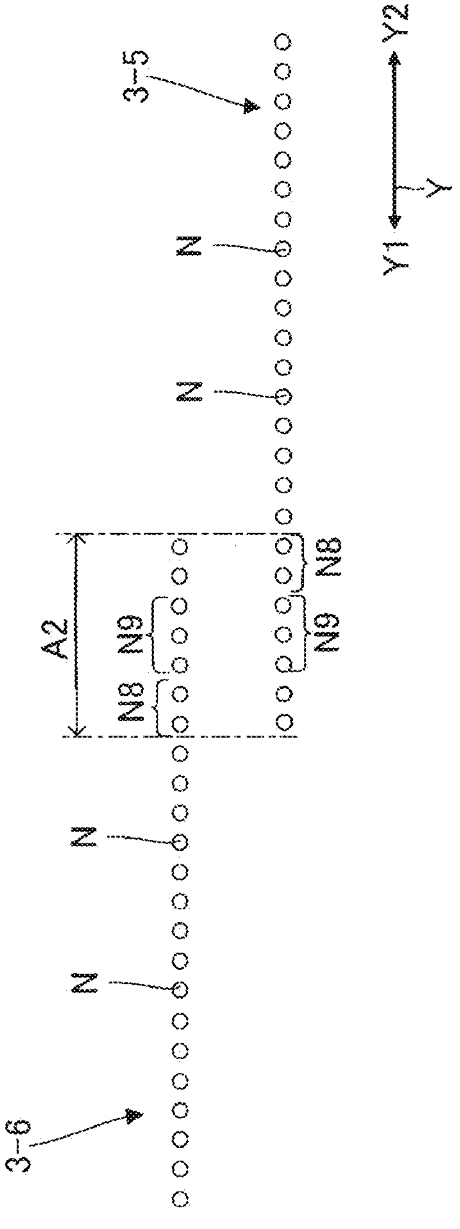
FIG. 16 is a diagram illustrating a number of overlapping nozzles in the second overlapping region where ink droplets are ejected.
Figure 17:
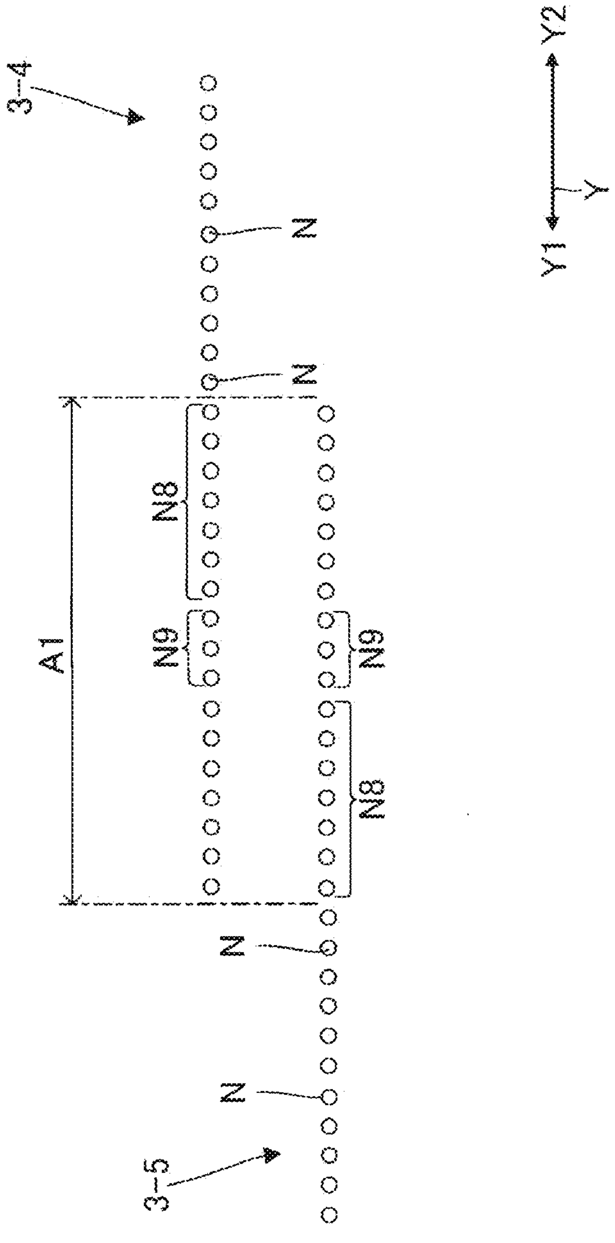
FIG. 17 is a diagram illustrating the number of overlapping nozzles in the first overlapping region where ink droplets are ejected.

FIG. 16 is a diagram illustrating the number of overlapping nozzles in the second overlapping region A2 where ink droplets are ejected. FIG. 17 is a diagram illustrating the number of overlapping nozzles in the first overlapping region A1 where ink droplets are ejected. Note that FIG. 16 and FIG. 17 illustrate the nozzle row La of each of the head chips 3 as a representative.

The number of nozzles in the first overlapping region A1 is different from that in the second overlapping region A2. However, the number of overlapping nozzles used to eject ink droplets may be set to be equal.

In the example illustrated in FIG. 16, seven nozzles of the nozzle row La of the head chip 3-6 belong to the second overlapping region A2, and seven nozzles of the nozzle row La of the head chip 3-5 belong to the second overlapping region A2. Of the seven nozzles N, three nozzles N9 and two nozzles N8 are nozzles N used to eject ink droplets. In the second overlapping region A2, the three nozzles N9 of the head chip 3-6 overlap with the three nozzles N9 of the head chip 3-5 when viewed in the X1 direction.

Therefore, the number of nozzles belonging to the second overlapping region A2 is seven in one nozzle row La. In contrast, in the second overlapping region A2, the number of overlapping nozzles used to eject ink droplets is three in the one nozzle row La.

In the example illustrated in FIG. 17, seventeen nozzles of the nozzle row La of the head chip 3-5 belong to the first overlapping region A1, and seventeen nozzles of the nozzle row La of the head chip 3-4 belong to the first overlapping region A1. Of the seventeen nozzles N, three nozzles N9 and seven nozzles N8 are nozzles N used to eject ink droplets. In the first overlapping region A1, the three nozzles N9 of the head chip 3-5 overlap with the three nozzles N9 of the head chip 3-4 when viewed in the X1 direction.

Therefore, the number of nozzles belonging to the first overlapping region A1 is seventeen in one nozzle row La. In contrast, in the first overlapping region A1, the number of overlapping nozzles used to eject ink droplets is three in the one nozzle row La.

In the first overlapping region A1 and the second overlapping region A2, the number of overlapping nozzles used to eject ink droplets is the same as each other. By making the number of overlapping nozzles equal in the respective overlapping regions A, it is possible to reduce a difference in overlapping ink droplets that land among the head chips 3, even when the first overlapping region A1 is made larger than the second overlapping region A2 with respect to the Y1 direction in order to provide the suppressing unit 60 in the liquid ejection head 30. Note that the overlap amount may be set according to a transport speed of the medium M due to the airflow velocity or a traveling speed of the carriage.

2. Modification Examples

Each of the exemplary embodiments described above may be modified in various manners. Specific modified embodiments that may be applied to each of the above-described embodiments will be exemplified below. Two or more aspects that are optionally selected from the following examples may be combined appropriately to the extent that they do not conflict with each other.

2-1. First Modification Example

Figure 18:
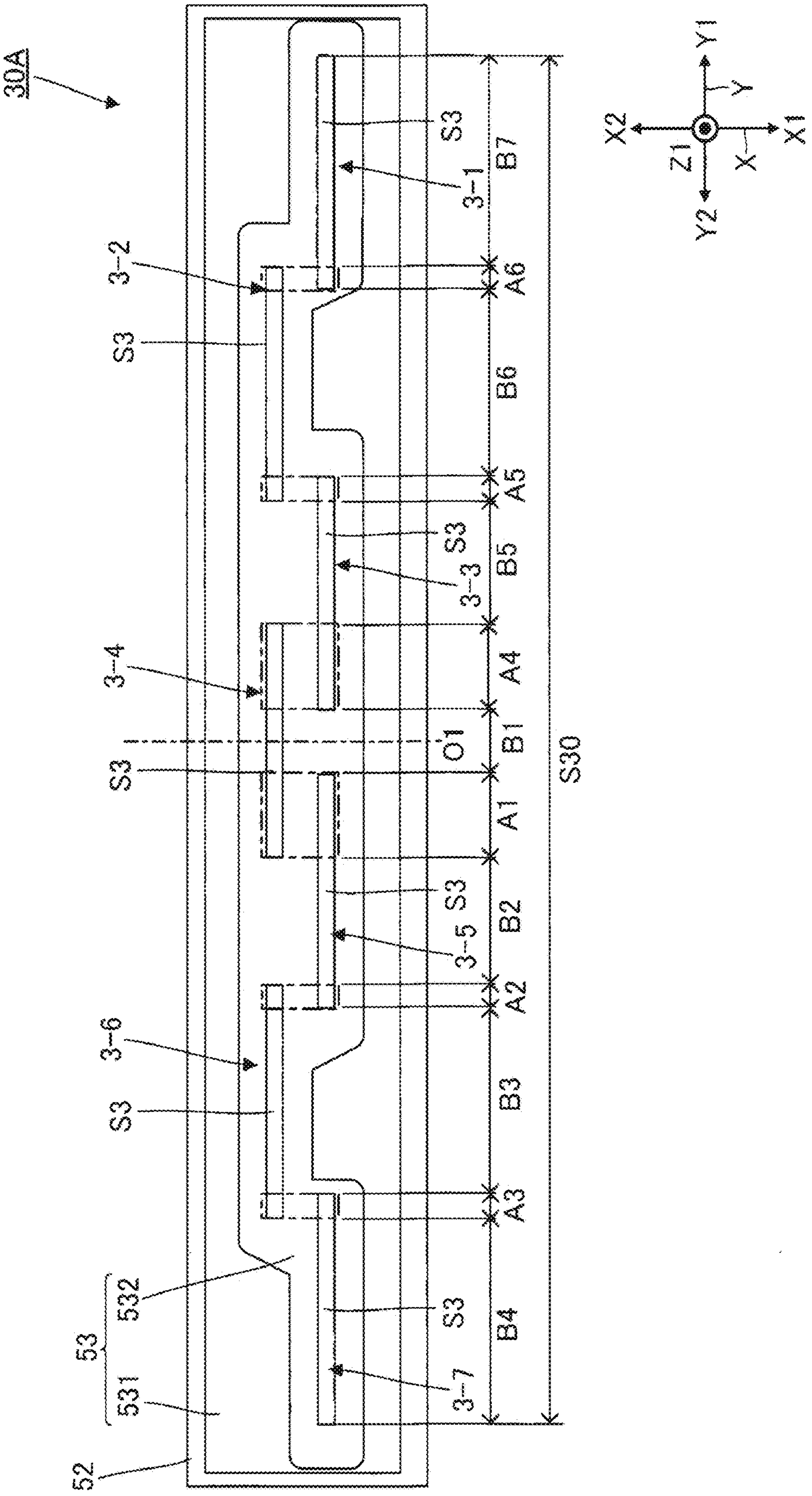
FIG. 18 is a bottom view of a liquid ejection head of a first modification example.

FIG. 18 is a bottom view of a liquid ejection head 30A of a first modification example. The liquid ejection head 30A of the first modification example illustrated in FIG. 18 includes the head chip 3-4 including the first overlapping region A1 and the non-overlapping region B1. The non-overlapping region B1 of the head chip 3-4 is a non-overlapping region B that does not overlap with the nozzle forming region S3 of the other head chip 3-5 when viewed in the X1 direction, and is equal to or less than half the size of the nozzle forming region S3. Even when the head chip 3-4 having such a non-overlapping region B1 is provided, the first overlapping region A1 being larger than the second overlapping region A2, it is possible to effectively suppress the deterioration in the print quality due to the differences in landing deviations between the plurality of head chips 3.

In the head chip 3-4 including the nozzle forming region S3 that constitutes the first overlapping region A1, the size of the non-overlapping region B, which differs from the overlapping region A, is equal to or smaller than the first overlapping region A1. The size of the non-overlapping region B1 being equal to or smaller than the size of the first overlapping region A1, it is possible to reduce the size of the liquid ejection head 30, with respect to the Y1 direction, as compared to a case in which the size of the non-overlapping region B1 exceeds the size of the first overlapping region A1.

Note that as with the above-described embodiment, the size of the non-overlapping region B1 exceeding that of the first overlapping region A1, it is possible to provide the liquid ejection head 30 suitable for a line head.

2-2. Second Modification Example

Figure 19:
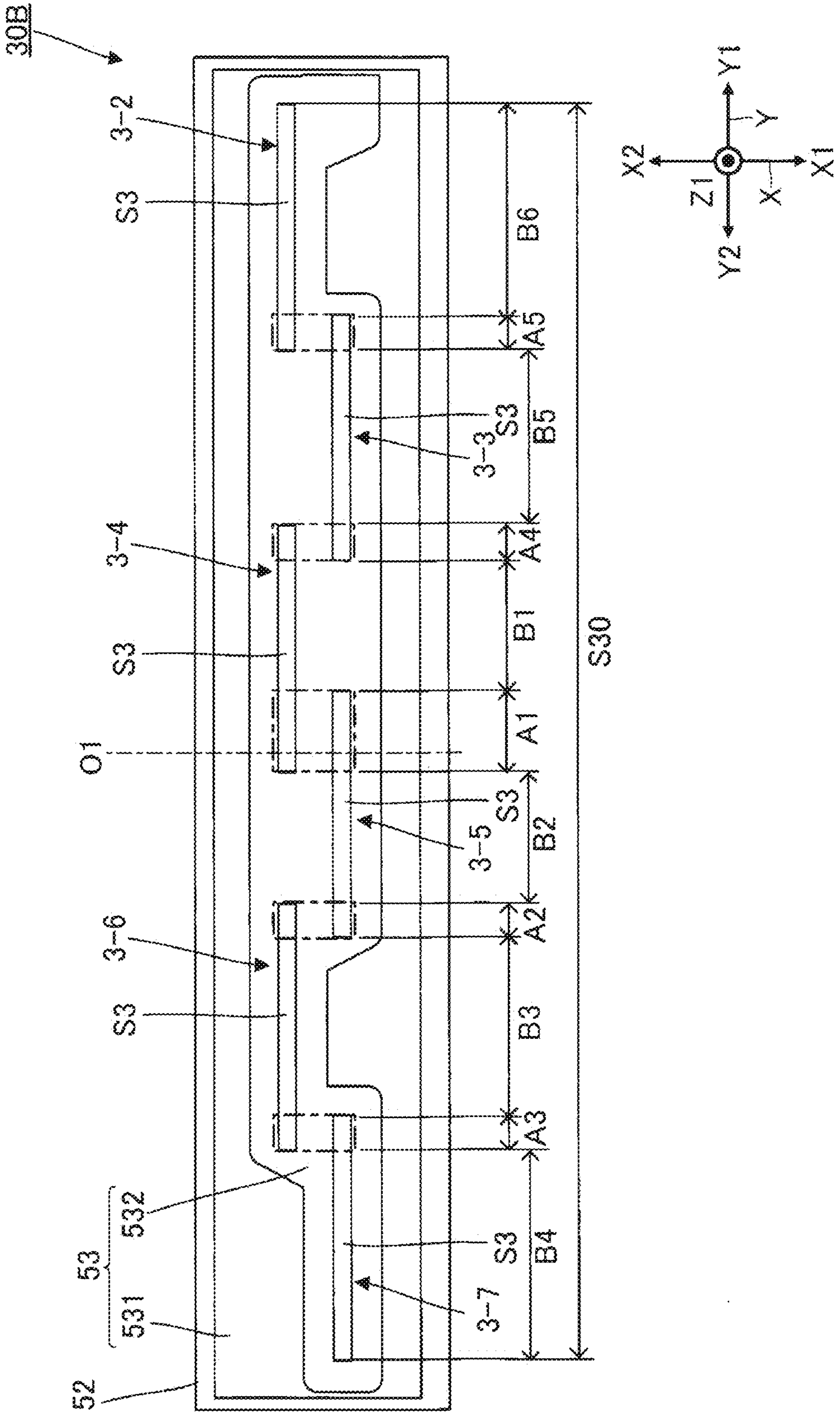
FIG. 19 is a bottom view of a liquid ejection head of a second modification example.

FIG. 19 is a bottom view of the liquid ejection head 30B of a second modification example. The liquid ejection head 30B of the second modification example illustrated in FIG. 19 includes six head chips 3. The number of the head chips 3 of the liquid ejection head 30B is an even number. In the example of FIG. 19, the center position O1 is located within the first overlapping region A1 in the Y1 direction. In addition, the fourth overlapping region A4 is disposed so as to sandwich the center position O1 with respect to the second overlapping region A2. With the respect of the Y1 direction, the size of the second overlapping region A2 is approximately the same as that of the fourth overlapping region A4. Even when the number of the head chips 3 is an even number, as with the above-described embodiment, it is possible to effectively suppress the deterioration in the print quality.

Note that approximately the same size refers to a difference between the two being 1% or less when the size of the nozzle forming region of one head chip in the first direction is 100%. For example, approximately the same size indicates that the difference is 4 nozzles or less, which is 1% of the number of nozzles, when the number of nozzles included in the nozzle forming region S3 of one head chip in the first direction is 400.

2-3. Third Modification Example

Figure 20:
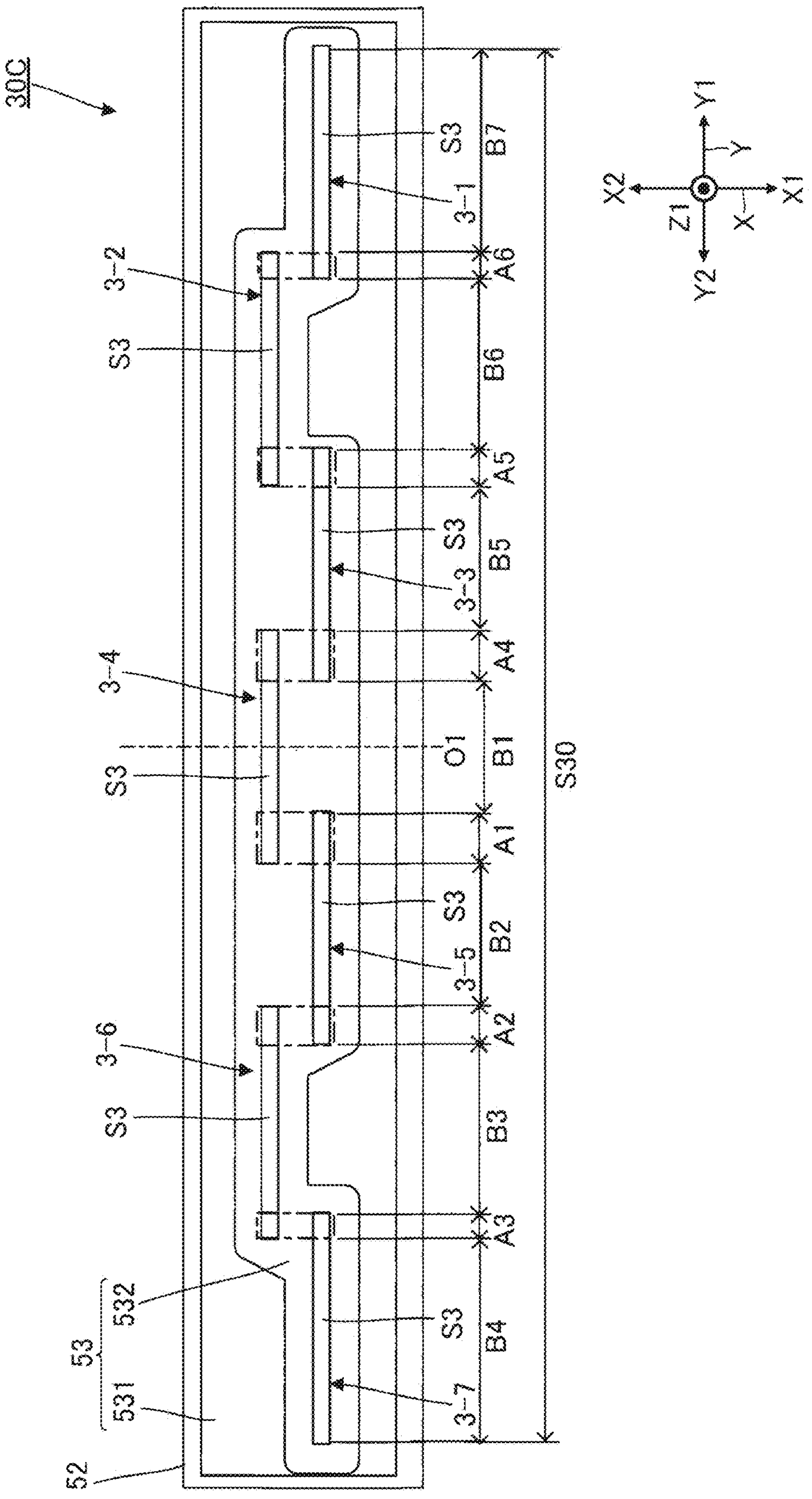
FIG. 20 is a bottom view of a liquid ejection head of a third modification example.

FIG. 20 is a bottom view of a liquid ejection head 30C of a third modification example. In the liquid ejection head 30C of the third modification example illustrated in FIG. 20, with respect to the Y1 direction, the second overlapping region A2 is smaller than the first overlapping region A1, and is larger than the third overlapping region A3. That is, the size of each of the third overlapping region A3, the second overlapping region A2, and the first overlapping region A1 increases in this order. Therefore, the size of the overlapping region A increases stepwise toward the center position O1. From another perspective, the size of the overlapping regions A varies according to a distribution of the airflow velocity with respect to the Y1 direction. According to such a modification example, it is possible to more effectively suppress the deterioration in the print quality due to the differences in landing deviations between the plurality of head chips 3, than the above-described embodiment. Note that similarly to the fourth overlapping region A4, the fifth overlapping region A5, and the sixth overlapping region A6, with respect to the Y1 direction, the fifth overlapping region A5 is smaller than the fourth overlapping region A4, and is larger than the sixth overlapping region A6.

2-4. Other Modification Examples

The head chip 3 does not have a structure for circulating ink, but the head chip 3 may be a circulation type head with a so-called circulating flow channel.

A "liquid ejection apparatus" may be applied to various devices such as a facsimile machines or copy machines, in addition to devices dedicated to printing. Uses of the liquid ejection apparatus are not limited to printing. For example, a liquid ejection apparatus that ejects a solution of a coloring material is used as a manufacturing apparatus for forming a color filter for a display device such as a liquid crystal display panel. In addition, a liquid ejection apparatus that ejects a solution of a conductive material is used as a manufacturing apparatus for forming wiring or electrodes for a wiring substrate. In addition, a liquid ejection apparatus for ejecting a solution of an organic substance related to a living body is used as a manufacturing apparatus for manufacturing biochips, for example.

Although the present disclosure has been described based on the preferred embodiments, the present disclosure is not limited to the above-described embodiments. In addition, the configuration of each part of the present disclosure can be replaced with any configuration that exhibits similar functions as the embodiments described above, and to which any configuration can be added.

What is claimed is:

1. A liquid ejection head comprising:

four or more head chips disposed along a first direction in a staggered manner, and a support member supporting the head chips, wherein the head chips are disposed to have overlapping regions where a part of a nozzle forming region of one head chip of adjacent head chips and a part of a nozzle forming region of other head chip overlap when viewed in a second direction that is perpendicular to the first direction, the overlapping regions include a first overlapping region, a second overlapping region that is farther away from a center position of a total nozzle forming region with respect to the first direction than the first overlapping region, and a third overlapping region that has a size smaller than the size of the first overlapping region, with respect to the first direction, the total nozzle forming region including all the nozzle forming regions of the head chips, the first overlapping region is larger than the second overlapping region with respect to the first direction, the second overlapping region is disposed between the first overlapping region and the third overlapping region, with respect to the first direction, and the support member has a notch between the second overlapping region and the third overlapping region.

2. The liquid ejection head according to claim 1, wherein The first overlapping region is an overlapping region that is closest to the center position among the overlapping regions, with respect to the first direction.

3. The liquid ejection head according to claim 1, wherein a size of the first overlapping region is equal to or more than twice an average size of the overlapping regions, with respect to the first direction.

4. The liquid ejection head according to claim 1, wherein a size of the second overlapping region is equal to or less than ½ the average size of the overlapping regions, with respect to the first direction.

5. The liquid ejection head according to claim 1, wherein the size of the first overlapping region is equal to or more than twice the average size of the overlapping regions, with respect to the first direction, and the size of the second overlapping region is equal to or less than ½ the average size of the overlapping regions, with respect to the first direction.

6. The liquid ejection head according to claim 1, wherein the size of the first overlapping region is 5 times or more the size of the second overlapping region, with respect to the first direction.

7. The liquid ejection head according to claim 1, wherein the chips include a head chip including the first overlapping region, and a non-overlapping region that does not overlap with the nozzle forming region of another head chip when viewed in the second direction and that is equal to or less than half the size of the nozzle forming region.

8. The liquid ejection head according to claim 1, wherein in the head chip including a nozzle forming region that constitutes the first overlapping region, a size of a non-overlapping region that is different from the overlapping region is equal to or smaller than the size of the first overlapping region.

9. The liquid ejection head according to claim 1, wherein the support member has no notch formed between the first overlapping region and the second overlapping region.

10. The liquid ejection head according to claim 1, wherein the overlapping regions include a fourth overlapping region disposed to sandwich the center position with the first overlapping region, and the size of the first overlapping region is approximately the same as that of the fourth overlapping region, with respect to the first direction.

11. The liquid ejection head according to claim 1, wherein the center position is located within the first overlapping region in the first direction, the overlapping region includes a fourth overlapping region disposed to sandwich the center position with the second overlapping region, and the size of the second overlapping region is approximately the same as that of the fourth overlapping region, with respect to the first direction.

12. The liquid ejection head according to claim 1, wherein the overlapping regions include the third overlapping region disposed so as to sandwich the second overlapping region with the first overlapping region, with respect to the first direction, the size of the second overlapping region is smaller than the size of the first overlapping region, and is larger than the size of the third overlapping region, with respect to the first direction.

13. The liquid ejection head according to claim 1, wherein a total size of the overlapping regions is smaller than a size of the nozzle forming region of the head chip, with respect to the first direction.

14. A liquid ejection apparatus, comprising:

a liquid ejection head according to claim 1, the liquid ejection head ejecting liquid onto a medium; and a transport unit that transports the medium.

15. A liquid ejection apparatus, comprising:

a liquid ejection head according to claim 1, the liquid ejection head ejecting liquid onto a medium; and a suppressing unit that suppresses floating of the medium, wherein the suppressing unit is disposed in the notch.

* * * * *